United States Patent
He et al.

(10) Patent No.: US 11,263,292 B2
(45) Date of Patent: Mar. 1, 2022

(54) METHOD, CIRCUIT, AND SOC FOR PERFORMING MATRIX MULTIPLICATION OPERATION

(71) Applicant: HUAWEI TECHNOLOGIES CO., LTD., Guangdong (CN)

(72) Inventors: Leijun He, Hangzhou (CN); Bin Xu, Hangzhou (CN); Kaixing Wang, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/324,533

(22) Filed: May 19, 2021

(65) Prior Publication Data

US 2021/0271736 A1    Sep. 2, 2021

Related U.S. Application Data

(63) Continuation of application No. PCT/CN2019/119794, filed on Nov. 20, 2019.

(30) Foreign Application Priority Data

Nov. 20, 2018    (CN) .......................... 201811384503.8

(51) Int. Cl.
  *G06F 17/16*    (2006.01)
(52) U.S. Cl.
  CPC .................................... *G06F 17/16* (2013.01)
(58) Field of Classification Search
  CPC ...................................................... G06F 17/16
  (Continued)

(56) References Cited

U.S. PATENT DOCUMENTS

| 4,914,615 A | 4/1990 | Karmarkar et al. |
| 10,311,127 B2 | 6/2019 | Rub |

(Continued)

FOREIGN PATENT DOCUMENTS

| CN | 1553577 A | 12/2004 |
| CN | 1702991 A | 11/2005 |

(Continued)

OTHER PUBLICATIONS

Zhuliang Yao et al, Balanced Sparsity for Efficient DNN Inference on GPU, arXiv:1811.00206v1 [cs.CV] Nov. 1, 2018, 8 pages.

(Continued)

*Primary Examiner* — Tan V Mai
(74) *Attorney, Agent, or Firm* — Womble Bond Dickinson (US) LLP

(57) ABSTRACT

A method for performing a matrix multiplication operation is provided. The method includes: obtaining a matrix B1, a matrix A2, and an index matrix, wherein the index matrix comprises indexes, in a matrix A1, of elements in the matrix A2; generating m matrices B2 based on the index matrix and the matrix B1, wherein the m matrices B2 are all matrices with t rows and n columns, and each row of each matrix B2 is a row indicated in the matrix B1 by a corresponding element in the index matrix; and generating a matrix C based on the matrix A2 and the m matrices B2, wherein the matrix C is a product of the matrix A1 and the matrix B1.

20 Claims, 16 Drawing Sheets

---

Obtain a matrix A1, a matrix B2, and an index matrix — 301

Generate n matrices A2 based on the index matrix and the matrix A1 — 302

Generate a matrix C based on the n matrices A2 and the matrix B2 — 303

(58) Field of Classification Search
USPC .......................................................... 708/607
See application file for complete search history.

(56) References Cited

U.S. PATENT DOCUMENTS

| | | | | |
|---|---|---|---|---|
| 10,936,311 | B1* | 3/2021 | Liu | .................... G06F 9/30036 |
| 2004/0083253 | A1 | 4/2004 | Lee | |
| 2011/0307685 | A1* | 12/2011 | Song | ....................... G06F 17/10 712/16 |
| 2019/0266217 | A1* | 8/2019 | Arakawa | ............. G06F 9/30036 |
| 2021/0065005 | A1* | 3/2021 | Zhu | ......................... G06F 17/16 |

FOREIGN PATENT DOCUMENTS

| CN | 102375721 A | 3/2012 |
|---|---|---|
| CN | 102541814 A | 7/2012 |
| CN | 103902507 A | 7/2014 |
| CN | 106126481 A | 11/2016 |
| CN | 106415552 A | 2/2017 |
| CN | 106991077 A | 7/2017 |
| CN | 107239823 A | 10/2017 |
| CN | 108763163 A | 11/2018 |
| CN | 108805273 A | 11/2018 |
| CN | 108875956 A | 11/2018 |
| WO | 2017124646 A1 | 7/2017 |
| WO | 2018154273 A1 | 8/2018 |

OTHER PUBLICATIONS

Shengfei Liu et al., Performance Evaluation of Multithreaded Sparse Matrix-Vector Multiplication using OpenMP, 2009 11th IEEE International Conference on High Performance Computing and Communications, total 7 pages.

Di Yan et al., An Efficient Sparse-Dense Matrix Multiplication on a Multicore System, 2017 17th IEEE International Conference on Communication Technology, total 4 pages.

* cited by examiner

Matrix B1:

| 1 | 5 | 1 | 0 | 0 | 0 | 0 | 1 | 0 | 0 | 5 | 0 | 0 | 0 | 0 | 1 |
|---|---|---|---|---|---|---|---|---|---|---|---|---|---|---|---|
| 0 | 0 | 0 | 0 | 0 | 0 | 0 | 0 | 5 | 0 | 6 | 0 | 5 | 0 | 0 | 2 |
| 0 | 6 | 0 | 5 | 0 | 0 | 0 | 0 | 0 | 0 | 0 | 1 | 6 | 1 | 0 | 0 |
| 0 | 0 | 0 | 0 | 0 | 0 | 0 | 0 | 0 | 0 | 2 | 0 | 2 | 0 | 0 | 0 |
| 2 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 5 | 0 | 0 | 0 | 0 | 0 | 0 | 0 | 0 | 0 |
| 3 | 7 | 2 | 0 | 0 | 0 | 0 | 0 | 0 | 0 | 0 | 0 | 0 | 0 | 0 | 0 |
| 0 | 0 | 0 | 0 | 0 | 0 | 0 | 0 | 7 | 0 | 0 | 0 | 0 | 0 | 0 | 0 |
| 0 | 0 | 0 | 0 | 0 | 0 | 0 | 0 | 0 | 2 | 0 | 0 | 0 | 0 | 0 | 3 |
| 0 | 0 | 0 | 6 | 0 | 1 | 0 | 0 | 0 | 3 | 0 | 0 | 7 | 0 | 0 | 0 |
| 0 | 0 | 0 | 7 | 0 | 0 | 6 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 3 | 8 | 0 | 0 | 0 |

FIG. 1

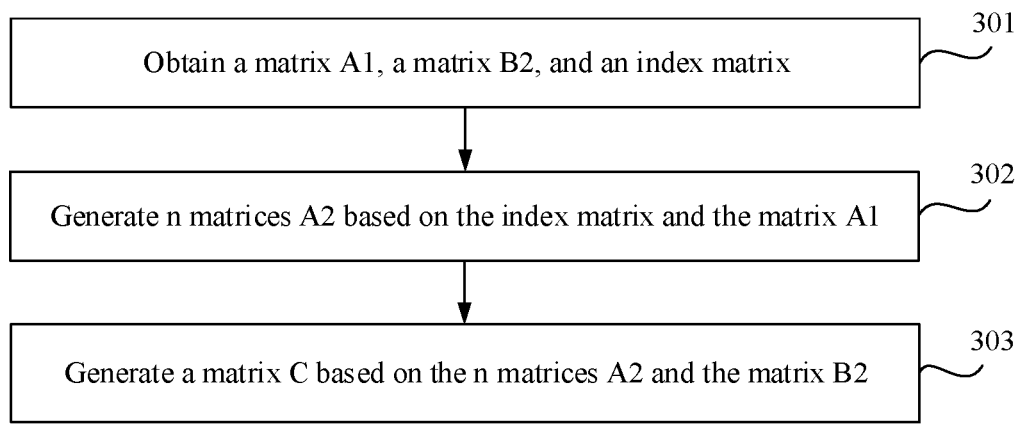

FIG. 2

```
┌─────────────────────────────────────────────────────────────┐  301
│   Obtain a matrix A1, a matrix B2, and an index matrix      │
└─────────────────────────────────────────────────────────────┘
                              │
                              ▼
┌─────────────────────────────────────────────────────────────┐  302
│   Generate n matrices A2 based on the index matrix and the matrix A1   │
└─────────────────────────────────────────────────────────────┘
                              │
                              ▼
┌─────────────────────────────────────────────────────────────┐  303
│   Generate a matrix C based on the n matrices A2 and the matrix B2     │
└─────────────────────────────────────────────────────────────┘
```

FIG. 3

Matrix B1:

| | | | | | | | | 16 | | | | | | | |
|---|---|---|---|---|---|---|---|---|---|---|---|---|---|---|---|
| 1 | 5 | 1 | 0 | 5 | 1 | 0 | 1 | 0 | 0 | 0 | 1 | 0 | 0 | 0 | 1 |
| 0 | 0 | 2 | 0 | 0 | 2 | 0 | 0 | 0 | 0 | 1 | 0 | 5 | 0 | 0 | 2 |
| 0 | 6 | 0 | 0 | 0 | 3 | 0 | 0 | 0 | 0 | 0 | 0 | 6 | 1 | 0 | 0 |
| 0 | 7 | 3 | 0 | 0 | 4 | 0 | 0 | 0 | 0 | 2 | 0 | 0 | 2 | 5 | 0 |
| 2 | 8 | 0 | 0 | 0 | 0 | 0 | 2 | 0 | 0 | 3 | 0 | 0 | 3 | 6 | 0 |
| 0 | 0 | 0 | 0 | 0 | 0 | 0 | 0 | 0 | 0 | 0 | 0 | 0 | 0 | 7 | 3 |
| 0 | 0 | 0 | 0 | 0 | 0 | 0 | 0 | 0 | 0 | 0 | 0 | 0 | 0 | 8 | 4 |
| 0 | 0 | 0 | 0 | 6 | 0 | 0 | 0 | 0 | 0 | 0 | 0 | 0 | 0 | 0 | 0 |
| 0 | 0 | 0 | 0 | 7 | 0 | 0 | 3 | 0 | 0 | 0 | 0 | 0 | 0 | 0 | 0 |
| 3 | 0 | 0 | 0 | 8 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 5 | 4 | 0 | 0 | 0 | 0 | 0 | 0 | 0 | 0 |
| 4 | 0 | 0 | 0 | 0 | 0 | 6 | 0 | 0 | 0 | 0 | 0 | 0 | 0 | 0 | 0 |
| 0 | 0 | 0 | 0 | 0 | 0 | 7 | 0 | 0 | 0 | 0 | 0 | 0 | 0 | 0 | 0 |
| 0 | 0 | 0 | 0 | 0 | 0 | 8 | 0 | 0 | 0 | 0 | 0 | 0 | 0 | 0 | 0 |

16 (rows)

FIG. 4

Matrix B2:

$$\underbrace{\begin{array}{|c|c|c|c|c|c|c|c|c|c|c|c|c|c|c|c|}\hline 1 & 5 & 1 & 0 & 5 & 1 & 5 & 1 & 0 & 0 & 1 & 1 & 5 & 1 & 5 & 1 \\ \hline 2 & 6 & 2 & 0 & 6 & 2 & 6 & 2 & 0 & 0 & 2 & 0 & 6 & 2 & 6 & 2 \\ \hline 3 & 7 & 3 & 0 & 7 & 3 & 7 & 3 & 0 & 0 & 3 & 0 & 0 & 3 & 7 & 3 \\ \hline 4 & 8 & 0 & 0 & 8 & 4 & 8 & 4 & 0 & 0 & 0 & 0 & 0 & 0 & 8 & 4 \\ \hline\end{array}}_{16}$$

Index matrix:

| 0 | 0 | 0 | X | 0 | 0 | 12 | 0 | X | X | 1 | 0 | 1 | 2 | 3 | 0 |
|---|---|---|---|---|---|----|---|---|---|---|---|---|---|---|---|
| 4 | 2 | 1 | X | 7 | 1 | 13 | 4 | X | X | 3 | X | 2 | 3 | 4 | 1 |
| 9 | 3 | 3 | X | 8 | 2 | 14 | 8 | X | X | 4 | X | X | 4 | 5 | 5 |
| 13| 4 | X | X | 9 | 3 | 15 | 12| X | X | X | X | X | X | 6 | 6 |

Matrix A1:

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 2 | 3 | 4 | 5 | 6 | 7 | 8 | 9 | 10 | 11 | 12 | 13 | 14 | 15 | 16 | 17 |
| 3 | 4 | 5 | 6 | 7 | 8 | 9 | 10 | 11 | 12 | 13 | 14 | 15 | 16 | 17 | 18 |
| 4 | 5 | 6 | 7 | 8 | 9 | 10 | 11 | 12 | 13 | 14 | 15 | 16 | 17 | 18 | 19 |
| 5 | 6 | 7 | 8 | 9 | 10 | 11 | 12 | 13 | 14 | 15 | 16 | 17 | 18 | 19 | 20 |
| 6 | 7 | 8 | 9 | 10 | 11 | 12 | 13 | 14 | 15 | 16 | 17 | 18 | 19 | 20 | 21 |
| 7 | 8 | 9 | 10 | 11 | 12 | 13 | 14 | 15 | 16 | 17 | 18 | 19 | 20 | 21 | 22 |
| 8 | 9 | 10 | 11 | 12 | 13 | 14 | 15 | 16 | 17 | 18 | 19 | 20 | 21 | 22 | 23 |
| 9 | 10 | 11 | 12 | 13 | 14 | 15 | 16 | 17 | 18 | 19 | 20 | 21 | 22 | 23 | 24 |
| 10 | 11 | 12 | 13 | 14 | 15 | 16 | 17 | 18 | 19 | 20 | 21 | 22 | 23 | 24 | 25 |
| 11 | 12 | 13 | 14 | 15 | 16 | 17 | 18 | 19 | 20 | 21 | 22 | 23 | 24 | 25 | 26 |
| 12 | 13 | 14 | 15 | 16 | 17 | 18 | 19 | 20 | 21 | 22 | 23 | 24 | 25 | 26 | 27 |
| 13 | 14 | 15 | 16 | 17 | 18 | 19 | 20 | 21 | 22 | 23 | 24 | 25 | 26 | 27 | 28 |
| 14 | 15 | 16 | 17 | 18 | 19 | 20 | 21 | 22 | 23 | 24 | 25 | 26 | 27 | 28 | 29 |
| 15 | 16 | 17 | 18 | 19 | 20 | 21 | 22 | 23 | 24 | 25 | 26 | 27 | 28 | 29 | 30 |
| 16 | 17 | 18 | 19 | 20 | 21 | 22 | 23 | 24 | 25 | 26 | 27 | 28 | 29 | 30 | 31 |

FIG. 7

| First matrix A2 | | | | Second matrix A2 | | | | Third matrix A2 | | | | Fourth matrix A2 | | | |
|---|---|---|---|---|---|---|---|---|---|---|---|---|---|---|---|
| 1 | 5 | 10 | 14 | 1 | 3 | 4 | 5 | 1 | 2 | 4 | X | X | X | X | X |
| 2 | 6 | 11 | 15 | 2 | 4 | 5 | 6 | 2 | 3 | 5 | X | X | X | X | X |
| 3 | 7 | 12 | 16 | 3 | 5 | 6 | 7 | 3 | 4 | 6 | X | X | X | X | X |
| 4 | 8 | 13 | 17 | 4 | 6 | 7 | 8 | 4 | 5 | 7 | X | X | X | X | X |
| 5 | 9 | 14 | 18 | 5 | 7 | 8 | 9 | 5 | 6 | 8 | X | X | X | X | X |
| 6 | 10 | 15 | 19 | 6 | 8 | 9 | 10 | 6 | 7 | 9 | X | X | X | X | X |
| 7 | 11 | 16 | 20 | 7 | 9 | 10 | 11 | 7 | 8 | 10 | X | X | X | X | X |
| 8 | 12 | 17 | 21 | 8 | 10 | 11 | 12 | 8 | 9 | 11 | X | X | X | X | X |
| 9 | 13 | 18 | 22 | 9 | 11 | 12 | 13 | 9 | 10 | 12 | X | X | X | X | X |
| 10 | 14 | 19 | 23 | 10 | 12 | 13 | 14 | 10 | 11 | 13 | X | X | X | X | X |
| 11 | 15 | 20 | 24 | 11 | 13 | 14 | 15 | 11 | 12 | 14 | X | X | X | X | X |
| 12 | 16 | 21 | 25 | 12 | 14 | 15 | 16 | 12 | 13 | 15 | X | X | X | X | X |
| 13 | 17 | 22 | 26 | 13 | 15 | 16 | 17 | 13 | 14 | 16 | X | X | X | X | X |
| 14 | 18 | 23 | 27 | 14 | 16 | 17 | 18 | 14 | 15 | 17 | X | X | X | X | X |
| 15 | 19 | 24 | 28 | 15 | 17 | 18 | 19 | 15 | 16 | 18 | X | X | X | X | X |
| 16 | 20 | 25 | 29 | 16 | 18 | 19 | 20 | 16 | 17 | 19 | X | X | X | X | X |

CONT. FROM FIG. 8A

| Fifth matrix A2 | | | |
|---|---|---|---|
| 1 | 8 | 9 | 10 |
| 2 | 9 | 10 | 11 |
| 3 | 10 | 11 | 12 |
| 4 | 11 | 12 | 13 |
| 5 | 12 | 13 | 14 |
| 6 | 13 | 14 | 15 |
| 7 | 14 | 15 | 16 |
| 8 | 15 | 16 | 17 |
| 9 | 16 | 17 | 18 |
| 10 | 17 | 18 | 19 |
| 11 | 18 | 19 | 20 |
| 12 | 19 | 20 | 21 |
| 13 | 20 | 21 | 22 |
| 14 | 21 | 22 | 23 |
| 15 | 22 | 23 | 24 |
| 16 | 23 | 24 | 25 |

| Sixth matrix A2 | | | |
|---|---|---|---|
| 1 | 2 | 3 | 4 |
| 2 | 3 | 4 | 5 |
| 3 | 4 | 5 | 6 |
| 4 | 5 | 6 | 7 |
| 5 | 6 | 7 | 8 |
| 6 | 7 | 8 | 9 |
| 7 | 8 | 9 | 10 |
| 8 | 9 | 10 | 11 |
| 9 | 10 | 11 | 12 |
| 10 | 11 | 12 | 13 |
| 11 | 12 | 13 | 14 |
| 12 | 13 | 14 | 15 |
| 13 | 14 | 15 | 16 |
| 14 | 15 | 16 | 17 |
| 15 | 16 | 17 | 18 |
| 16 | 17 | 18 | 19 |

| Seventh matrix A2 | | | |
|---|---|---|---|
| 13 | 14 | 15 | 16 |
| 14 | 15 | 16 | 17 |
| 15 | 16 | 17 | 18 |
| 16 | 17 | 18 | 19 |
| 17 | 18 | 19 | 20 |
| 18 | 19 | 20 | 21 |
| 19 | 20 | 21 | 22 |
| 20 | 21 | 22 | 23 |
| 21 | 22 | 23 | 24 |
| 22 | 23 | 24 | 25 |
| 23 | 24 | 25 | 26 |
| 24 | 25 | 26 | 27 |
| 25 | 26 | 27 | 28 |
| 26 | 27 | 28 | 29 |
| 27 | 28 | 29 | 30 |
| 28 | 29 | 30 | 31 |

| Eighth matrix A2 | | | |
|---|---|---|---|
| 1 | 5 | 9 | 13 |
| 2 | 6 | 10 | 14 |
| 3 | 7 | 11 | 15 |
| 4 | 8 | 12 | 16 |
| 5 | 9 | 13 | 17 |
| 6 | 10 | 14 | 18 |
| 7 | 11 | 15 | 19 |
| 8 | 12 | 16 | 20 |
| 9 | 13 | 17 | 21 |
| 10 | 14 | 18 | 22 |
| 11 | 15 | 19 | 23 |
| 12 | 16 | 20 | 24 |
| 13 | 17 | 21 | 25 |
| 14 | 18 | 22 | 26 |
| 15 | 19 | 23 | 27 |
| 16 | 20 | 24 | 28 |

CONT. FROM
FIG. 8B

| Ninth matrix A2 | | | | Tenth matrix A2 | | | | ~ | Eleventh matrix A2 | | | | Twelfth matrix A2 | | | |
|---|---|---|---|---|---|---|---|---|---|---|---|---|---|---|---|---|
| X | X | X | X | X | X | X | X | | 2 | 4 | 5 | X | 1 | X | X | X |
| X | X | X | X | X | X | X | X | | 3 | 5 | 6 | X | 2 | X | X | X |
| X | X | X | X | X | X | X | X | | 4 | 6 | 7 | X | 3 | X | X | X |
| X | X | X | X | X | X | X | X | | 5 | 7 | 8 | X | 4 | X | X | X |
| X | X | X | X | X | X | X | X | | 6 | 8 | 9 | X | 5 | X | X | X |
| X | X | X | X | X | X | X | X | | 7 | 9 | 10 | X | 6 | X | X | X |
| X | X | X | X | X | X | X | X | | 8 | 10 | 11 | X | 7 | X | X | X |
| X | X | X | X | X | X | X | X | | 9 | 11 | 12 | X | 8 | X | X | X |
| X | X | X | X | X | X | X | X | | 10 | 12 | 13 | X | 9 | X | X | X |
| X | X | X | X | X | X | X | X | | 11 | 13 | 14 | X | 10 | X | X | X |
| X | X | X | X | X | X | X | X | | 12 | 14 | 15 | X | 11 | X | X | X |
| X | X | X | X | X | X | X | X | | 13 | 15 | 16 | X | 12 | X | X | X |
| X | X | X | X | X | X | X | X | | 14 | 16 | 17 | X | 13 | X | X | X |
| X | X | X | X | X | X | X | X | | 15 | 17 | 18 | X | 14 | X | X | X |
| X | X | X | X | X | X | X | X | | 16 | 18 | 19 | X | 15 | X | X | X |
| X | X | X | X | X | X | X | X | | 17 | 19 | 20 | X | 16 | X | X | X |

CONT. FROM FIG. 8C →

| Thirteenth matrix A2 | | | | Fourteenth matrix A2 | | | | Fifteenth matrix A2 | | | | Sixteenth matrix A2 | | | |
|---|---|---|---|---|---|---|---|---|---|---|---|---|---|---|---|
| 2 | 3 | X | X | 3 | 4 | 5 | X | 4 | 5 | 6 | 7 | 1 | 2 | 6 | 7 |
| 3 | 4 | X | X | 4 | 5 | 6 | X | 5 | 6 | 7 | 8 | 2 | 3 | 7 | 8 |
| 4 | 5 | X | X | 5 | 6 | 7 | X | 6 | 7 | 8 | 9 | 3 | 4 | 8 | 9 |
| 5 | 6 | X | X | 6 | 7 | 8 | X | 7 | 8 | 9 | 10 | 4 | 5 | 9 | 10 |
| 6 | 7 | X | X | 7 | 8 | 9 | X | 8 | 9 | 10 | 11 | 5 | 6 | 10 | 11 |
| 7 | 8 | X | X | 8 | 9 | 10 | X | 9 | 10 | 11 | 12 | 6 | 7 | 11 | 12 |
| 8 | 9 | X | X | 9 | 10 | 11 | X | 10 | 11 | 12 | 13 | 7 | 8 | 12 | 13 |
| 9 | 10 | X | X | 10 | 11 | 12 | X | 11 | 12 | 13 | 14 | 8 | 9 | 13 | 14 |
| 10 | 11 | X | X | 11 | 12 | 13 | X | 12 | 13 | 14 | 15 | 9 | 10 | 14 | 15 |
| 11 | 12 | X | X | 12 | 13 | 14 | X | 13 | 14 | 15 | 16 | 10 | 11 | 15 | 16 |
| 12 | 13 | X | X | 13 | 14 | 15 | X | 14 | 15 | 16 | 17 | 11 | 12 | 16 | 17 |
| 13 | 14 | X | X | 14 | 15 | 16 | X | 15 | 16 | 17 | 18 | 12 | 13 | 17 | 18 |
| 14 | 15 | X | X | 15 | 16 | 17 | X | 16 | 17 | 18 | 19 | 13 | 14 | 18 | 19 |
| 15 | 16 | X | X | 16 | 17 | 18 | X | 17 | 18 | 19 | 20 | 14 | 15 | 19 | 20 |
| 16 | 17 | X | X | 17 | 18 | 19 | X | 18 | 19 | 20 | 21 | 15 | 16 | 20 | 21 |
| 17 | 18 | X | X | 18 | 19 | 20 | X | 19 | 20 | 21 | 22 | 16 | 17 | 21 | 22 |

FIG. 8D

Matrix C:

| 97 | 91 | 17 | 0 | 196 | 30 | 382 | 90 | 0 | 0 | 25 | 1 | 28 | 26 | 148 | 51 |
|---|---|---|---|---|---|---|---|---|---|---|---|---|---|---|---|
| 107 | 117 | 23 | 0 | 222 | 40 | 408 | 100 | 0 | 0 | 31 | 2 | 39 | 32 | 174 | 61 |
| 117 | 143 | 29 | 0 | 248 | 50 | 434 | 110 | 0 | 0 | 37 | 3 | 50 | 38 | 200 | 71 |
| 127 | 169 | 35 | 0 | 274 | 60 | 460 | 120 | 0 | 0 | 43 | 4 | 61 | 44 | 226 | 81 |
| 137 | 195 | 41 | 0 | 300 | 70 | 486 | 130 | 0 | 0 | 49 | 5 | 72 | 50 | 252 | 91 |
| 147 | 221 | 47 | 0 | 326 | 80 | 512 | 140 | 0 | 0 | 55 | 6 | 83 | 56 | 278 | 101 |
| 157 | 247 | 53 | 0 | 352 | 90 | 538 | 150 | 0 | 0 | 61 | 7 | 94 | 62 | 304 | 111 |
| 167 | 273 | 59 | 0 | 378 | 100 | 564 | 160 | 0 | 0 | 67 | 8 | 105 | 68 | 330 | 121 |
| 177 | 299 | 65 | 0 | 404 | 110 | 590 | 170 | 0 | 0 | 73 | 9 | 116 | 74 | 356 | 131 |
| 187 | 325 | 71 | 0 | 430 | 120 | 616 | 180 | 0 | 0 | 79 | 10 | 127 | 80 | 382 | 141 |
| 197 | 351 | 77 | 0 | 456 | 130 | 642 | 190 | 0 | 0 | 85 | 11 | 138 | 86 | 408 | 151 |
| 207 | 377 | 83 | 0 | 482 | 140 | 668 | 200 | 0 | 0 | 91 | 12 | 149 | 92 | 434 | 161 |
| 217 | 403 | 89 | 0 | 508 | 150 | 694 | 210 | 0 | 0 | 97 | 13 | 160 | 98 | 460 | 171 |
| 227 | 429 | 95 | 0 | 534 | 160 | 720 | 220 | 0 | 0 | 103 | 14 | 171 | 104 | 486 | 181 |
| 237 | 455 | 101 | 0 | 560 | 170 | 746 | 230 | 0 | 0 | 109 | 15 | 182 | 110 | 512 | 191 |
| 247 | 481 | 107 | 0 | 586 | 180 | 772 | 240 | 0 | 0 | 115 | 16 | 193 | 116 | 538 | 201 |

FIG. 9

Matrix A1:

| 1 | 0 | 2 | 0 |
|---|---|---|---|
| 0 | 3 | 4 | 0 |
| 5 | 6 | 0 | 0 |
| 0 | 7 | 0 | 0 |
| 0 | 0 | 8 | 9 |

Matrix B1:

|   | 3 |   |
|---|---|---|
| 1 | 2 | 3 |
| 2 | 3 | 4 |
| 3 | 4 | 5 |
| 4 | 5 | 6 |

(4 rows)

FIG. 14

First matrix B2

| 1 | 2 | 3 |
|---|---|---|
| 3 | 4 | 5 |

Second matrix B2

| 2 | 3 | 4 |
|---|---|---|
| 3 | 4 | 5 |

Third matrix B2

| 1 | 2 | 3 |
|---|---|---|
| 2 | 3 | 4 |

Fourth matrix B2

| 2 | 3 | 4 |
|---|---|---|
| X | X | X |

Fifth matrix B2

| 3 | 4 | 5 |
|---|---|---|
| 4 | 5 | 6 |

FIG. 15

Matrix C:

|   | 3  |    |
|---|----|----|
| 7 | 10 | 13 |
| 18| 25 | 32 |
| 17| 28 | 39 |
| 14| 21 | 28 |
| 60| 77 | 94 |

(5 rows)

FIG. 16

METHOD, CIRCUIT, AND SOC FOR PERFORMING MATRIX MULTIPLICATION OPERATION

CROSS-REFERENCE TO RELATED APPLICATIONS

This application is a continuation of International Application No. PCT/CN2019/119794, filed on Nov. 20, 2019, which claims priority to Chinese Patent Application No. 201811384503.8, filed on Nov. 20, 2018. The disclosures of the aforementioned applications are hereby incorporated by reference in their entireties.

TECHNICAL FIELD

This application relates to the field of data processing, and in particular, to a method, a circuit, and a system on chip (SOC) for performing a matrix multiplication operation.

BACKGROUND

An artificial intelligence (AI) technology is widely applied to terminals, edge, cloud, and the like to implement functions such as image recognition, target detection, and voice translation. The artificial intelligence technology is usually implemented by using a deep learning network. For the deep learning network, operators that have relatively large impact on performance and have a relatively large computing workload, for example, convolution, inner product, or other operators whose computing workload may account for 99%, may be all expanded into operations of multiplying one matrix by another matrix. Certainly, as a common data expression form, the operation of multiplying one matrix by another matrix is also often applied to another field.

Currently, when a matrix multiplication operation is performed, an operation of multiplying one matrix by another matrix is usually split into operations of multiplying a vector by a matrix. It is assumed that a matrix A is a matrix with m rows and k columns, a matrix B is a matrix with k rows and n columns, and m, k, and n are all positive integers. When the matrix A is multiplied by the matrix B, the m rows of the matrix A are sequentially multiplied by the matrix B. When a row of the matrix A is multiplied by the matrix B, n processing elements (PE) respectively obtain index modules (used to locate a non-zero element) of the n columns of the matrix B. Then, each of the n PEs reads data from the row of the matrix A based on an index module, obtained by the PE, in a column of the matrix B, and multiplies the read data by the column of the matrix B.

In the foregoing operation manner, because the m rows of the matrix A are sequentially multiplied by the matrix B, an entire operation process needs to consume a relatively long time, and operation efficiency is relatively low. Moreover, because distribution of non-zero elements in each column of the matrix B is irregular, when reading data from a row of the matrix A based on an index module of a column of the matrix B, each PE reads a plurality of pieces of data that are distributed relatively discretely in the row of the matrix A. However, the matrix A is usually stored at a plurality of addresses in a memory in a distributed manner. Therefore, if the PE reads data from the matrix A at a time, address conflict is very likely to occur because data at a plurality of addresses in the memory is read at the same time. Consequently, the data cannot be read. In addition, because the matrix B needs to be read once when each of the m rows of the matrix A is multiplied by the matrix B, the matrix B needs to be read m times in total in the entire operation process. Consequently, data reusability is relatively low, and a relatively large quantity of processing resources are consumed.

SUMMARY

This application provides a method, a circuit, and a SOC for performing a matrix multiplication operation, to resolve problems in a related technology that operation efficiency of a matrix multiplication operation is relatively low, address conflict occurs during data reading, and data reusability is relatively low. The technical solutions are as follows:

According to a first aspect, a method for performing a matrix multiplication operation is provided. The method includes: obtaining a matrix A1, a matrix B2, and an index matrix, where the matrix A1 is a matrix with m rows and k columns, the matrix B2 is a matrix with t rows and n columns, the index matrix is a matrix with t rows and n columns, m, k, t, and n are all positive integers, and t is less than or equal to k; generating n matrices A2 based on the index matrix and the matrix A1, where the n matrices A2 are all matrices with m rows and t columns, the n matrices A2 are in a one-to-one correspondence with the n columns of the index matrix in sequence, t columns of each matrix A2 are in a one-to-one correspondence with t elements in a corresponding column of the index matrix in sequence, and each column of each matrix A2 is a column indicated in the matrix A1 by a corresponding element in the index matrix; and generating a matrix C based on the n matrices A2 and the matrix B2, where the matrix C is a matrix with m rows and n columns, the n columns of the matrix C are in a one-to-one correspondence with the n matrices A2 in sequence, the n columns of the matrix C are in a one-to-one correspondence with the n columns of the matrix B2 in sequence, and each column of the matrix C is a product of a corresponding matrix A2 and a corresponding column of the matrix B2.

It should be noted that, the matrix B2 includes all non-zero elements (valid data) in a matrix B1. The index matrix includes indexes, in the matrix B1, of elements in the matrix B2, or in other words, includes indexes, in the matrix B1, of all the non-zero elements in the matrix B1.

In an embodiment of this application, the n matrices A2 may be read from the matrix A1 at a time based on the index matrix, and then the n matrices A2 may be respectively multiplied by the n columns of the matrix B2 to obtain the matrix C. Because the matrix multiplication operation can be completed by reading data from the matrix A1 only once, data reusability can be maximized, and processing resources can be saved. In addition, when the n matrices A2 are respectively multiplied by the n columns of the matrix B2, because sizes of the n matrices A2 are the same, multiplication operations of the n matrices A2 and the n columns of the matrix B2 may be performed in parallel, and may be completed within a same time, so that an operation time can be reduced, and operation efficiency can be improved.

The obtaining a matrix B2 and an index matrix includes: obtaining a matrix B1, where the matrix B1 is a matrix with k rows and n columns, elements in each of the n columns of the matrix B1 are sequentially grouped into groups whose quantity is a preset value, a quantity of elements in each group is k1, a quantity of non-zero elements in each group of elements is less than or equal to k2, the preset value is k/k1, k is greater than or equal to k1 and k can be exactly divided by k1, and k1 is greater than or equal to k2 and k1 can be exactly divided by k2; generating the matrix B2 based on the matrix B1, where the n columns of the matrix B2 are in a one-to-one correspondence with the n columns of the matrix B1 in sequence, and elements in each column of the matrix B2 include all non-zero elements in groups that are sequentially arranged in a corresponding column of the matrix B1 and whose quantity is the preset value; and generating the index matrix based on the matrix B1, where the n columns of the index matrix are in a one-to-one correspondence with the n columns of the matrix B2 in sequence, and elements in each column of the index matrix are row indexes, in the matrix B1, of all elements that are sequentially arranged in a corresponding column of the matrix B2.

It should be noted that, the matrix B1 is a matrix that meets conditional sparsity, and the matrix B1 may be obtained through training by using a neural network. For example, in a deep learning scenario, by controlling a training process of a deep learning network, distribution of parameters of convolution, inner product, or other operators may be trained to follow a distribution rule that meets the conditional sparsity, to obtain a parameter matrix that meets the conditional sparsity as the matrix B1.

In an embodiment of this application, a quantity of non-zero elements in each of the n columns of the matrix B1 is controlled within a specific range. In this way, a data index range can be effectively controlled, so that a scale of the index matrix can be effectively reduced, and engineering implementability can be ensured. In addition, in this embodiment of this application, the matrix multiplication operation can be completed by using the only one index matrix. Therefore, fewer logical resources are consumed.

For any non-zero element in the matrix B2, a row index of the non-zero element in the matrix B1 is a row number of a row to which the non-zero element belongs in the matrix B1; and for any element that is zero in the matrix B2, a row index of the element that is zero in the matrix B1 is a first character.

For any element in the index matrix, when the element in the index matrix is not the first character, a column indicated in the matrix A1 by the element in the index matrix is a column that is in all the columns of the matrix A1 and whose column number is the element in the index matrix; or when the element in the index matrix is the first character, elements in a column of a matrix A2 corresponding to the element in the index matrix are m second characters.

It should be noted that, introducing the first character and the second character may meet a matrix element alignment requirement.

In an embodiment of this application, elements in t columns of the matrix A1 are directly read based on t elements in each column of the index matrix to constitute a matrix A2. In this case, because distribution of to-be-read data in the matrix A1 is relatively regular and centralized, when the matrix A1 is stored in a memory, the k columns of the matrix A1 may be respectively stored at a plurality of addresses in the memory. In this case, required data may be read from the memory at a time based on the index matrix, so that not only a memory access bandwidth required for data reading can be greatly reduced, but also an address conflict problem that may occur when data is read from the memory can be eliminated.

According to a second aspect, a method for performing a matrix multiplication operation is provided. The method includes: obtaining a matrix B1, a matrix A2, and an index matrix, where the matrix B1 is a matrix with k rows and n columns, the matrix A2 is a matrix with m rows and t columns, the index matrix is a matrix with m rows and t columns, k, n, m, and t are all positive integers, and t is less than or equal to k; generating m matrices B2 based on the index matrix and the matrix B1, where the m matrices B2 are all matrices with t rows and n columns, the m matrices B2 are in a one-to-one correspondence with the m rows of the index matrix in sequence, t rows of each matrix B2 are in a one-to-one correspondence with t elements in a corresponding row of the index matrix in sequence, and each row of each matrix B2 is a row indicated in the matrix B1 by a corresponding element in the index matrix; and generating a matrix C based on the matrix A2 and the m matrices B2, where the matrix C is a matrix with m rows and n columns, the m rows of the matrix C are in a one-to-one correspondence with the m rows of the matrix A2 in sequence, the m rows of the matrix C are in a one-to-one correspondence with the m matrices B2 in sequence, and each row of the matrix C is a product of a corresponding row of the matrix A2 and a corresponding matrix B2.

It should be noted that, the matrix A2 includes all non-zero elements (valid data) in a matrix A1. The index matrix includes indexes, in the matrix A1, of elements in the matrix A2, or in other words, includes indexes, in the matrix A1, of all the non-zero elements in the matrix A1.

In an embodiment of this application, the m matrices B2 may be read from the matrix B1 at a time based on the index matrix, and then the m rows of the matrix A2 may be respectively multiplied by the m matrices B2 to obtain the matrix C. Because the matrix multiplication operation can be completed by reading data from the matrix B1 only once, data reusability can be maximized, and processing resources can be saved. In addition, when the m rows of the matrix A2 are respectively multiplied by the m matrices B2, because sizes of the m matrices B2 are the same, multiplication operations of the m rows of the matrix A2 and the m matrices B2 may be performed in parallel, and may be completed within a same time, so that an operation time can be reduced, and operation efficiency can be improved.

The obtaining a matrix A2 and an index matrix includes: obtaining a matrix A1, where the matrix A1 is a matrix with m rows and k columns, elements in each of the m rows of the matrix A1 are sequentially grouped into groups whose quantity is a preset value, a quantity of elements in each group is k1, a quantity of non-zero elements in each group of elements is less than or equal to k2, the preset value is k/k1, k is greater than or equal to k1 and k can be exactly divided by k1, and k1 is greater than or equal to k2 and k1 can be exactly divided by k2; generating the matrix A2 based on the matrix A1, where the m rows of the matrix A2 are in a one-to-one correspondence with the m rows of the matrix A1 in sequence, and elements in each row of the matrix A2 include all non-zero elements in groups that are sequentially arranged in a corresponding row of the matrix A1 and whose quantity is the preset value; and generating the index matrix based on the matrix A1, where the m rows of the index matrix are in a one-to-one correspondence with the m rows of the matrix A2 in sequence, and elements in each row of the index matrix are column indexes, in the matrix A1, of all elements that are sequentially arranged in a corresponding row of the matrix A2.

It should be noted that, the matrix A1 is a matrix that meets conditional sparsity, and the matrix A1 may be obtained through training by using a neural network. For example, in a deep learning scenario, by controlling a training process of a deep learning network, distribution of parameters of convolution, inner product, or other operators may be trained to follow a distribution rule that meets the conditional sparsity, to obtain a parameter matrix that meets the conditional sparsity as the matrix A1.

In an embodiment of this application, a quantity of non-zero elements in each of the m rows of the matrix A1 is controlled within a specific range. In this way, a data index range can be effectively controlled, so that a scale of the index matrix can be effectively reduced, and engineering implementability can be ensured. In addition, in this embodiment of this application, the matrix multiplication operation can be completed by using the only one index matrix. Therefore, fewer logical resources are consumed.

For any non-zero element in the matrix A2, a column index of the non-zero element in the matrix A1 is a column number of a column to which the non-zero element belongs in the matrix A1; and for any element that is zero in the matrix A2, a column index of the element that is zero in the matrix A1 is a first character.

For any element in the index matrix, when the element in the index matrix is not the first character, a row indicated in the matrix B1 by the element in the index matrix is a row that is in all the rows of the matrix B1 and whose row number is the element in the index matrix; or when the element in the index matrix is the first character, elements in a row of a matrix B2 corresponding to the element in the index matrix are n second characters.

It should be noted that, introducing the first character and the second character may meet a matrix element alignment requirement.

In an embodiment of this application, elements in t rows of the matrix B1 are directly read based on t elements in each row of the index matrix to constitute a matrix B2. In this case, because distribution of to-be-read data in the matrix B1 is relatively regular and centralized, when the matrix B1 is stored in a memory, the k rows of the matrix B1 may be respectively stored at a plurality of addresses in the memory. In this case, required data may be read from the memory at a time based on the index matrix, so that not only a memory access bandwidth required for data reading can be greatly reduced, but also an address conflict problem that may occur when data is read from the memory can be eliminated.

According to a third aspect, a circuit for performing a matrix multiplication operation is provided. The circuit includes:

an obtaining circuit, configured to obtain a matrix A1, a matrix B2, and an index matrix, where the matrix A1 is a matrix with m rows and k columns, the matrix B2 is a matrix with t rows and n columns, the index matrix is a matrix with t rows and n columns, m, k, t, and n are all positive integers, and t is less than or equal to k;

a data selection circuit, configured to generate n matrices A2 based on the index matrix and the matrix A1, where the n matrices A2 are all matrices with m rows and t columns, the n matrices A2 are in a one-to-one correspondence with the n columns of the index matrix in sequence, t columns of each matrix A2 are in a one-to-one correspondence with t elements in a corresponding column of the index matrix in sequence, and each column of each matrix A2 is a column indicated in the matrix A1 by a corresponding element in the index matrix; and a computing unit array, configured to generate a matrix C based on the n matrices A2 and the matrix B2, where the matrix C is a matrix with m rows and n columns, the n columns of the matrix C are in a one-to-one correspondence with the n matrices A2 in sequence, the n columns of the matrix C are in a one-to-one correspondence with the n columns of the matrix B2 in sequence, and each column of the matrix C is a product of a corresponding matrix A2 and a corresponding column of the matrix B2.

When configured to obtain the matrix B2 and the index matrix, the obtaining circuit is configured to:

obtain a matrix B1, where the matrix B1 is a matrix with k rows and n columns, elements in each of the n columns of the matrix B1 are sequentially grouped into groups whose quantity is a preset value, a quantity of elements in each group is k1, a quantity of non-zero elements in each group of elements is less than or equal to k2, the preset value is k/k1, k is greater than or equal to k1 and k can be exactly divided by k1, and k1 is greater than or equal to k2 and k1 can be exactly divided by k2;

generate the matrix B2 based on the matrix B1, where the n columns of the matrix B2 are in a one-to-one correspondence with the n columns of the matrix B1 in sequence, and elements in each column of the matrix B2 include all non-zero elements in groups that are sequentially arranged in a corresponding column of the matrix B1 and whose quantity is the preset value; and generate the index matrix based on the matrix B1, where the n columns of the index matrix are in a one-to-one correspondence with the n columns of the matrix B2 in sequence, and elements in each column of the index matrix are row indexes, in the matrix B1, of all elements that are sequentially arranged in a corresponding column of the matrix B2.

It should be noted that, for any non-zero element in the matrix B2, a row index of the non-zero element in the matrix B1 is a row number of a row to which the non-zero element belongs in the matrix B1; and for any element that is zero in the matrix B2, a row index of the element that is zero in the matrix B1 is a first character.

In addition, for any element in the index matrix, when the element in the index matrix is not the first character, a column indicated in the matrix A1 by the element in the index matrix is a column that is in all the columns of the matrix A1 and whose column number is the element in the index matrix; or when the element in the index matrix is the first character, elements in a column of a matrix A2 corresponding to the element in the index matrix are m second characters.

In addition, the matrix B1 is obtained through training by using a neural network.

Further, the circuit further includes a first memory, and the first memory is configured to store the matrix A1, the matrix B2, and the index matrix; and correspondingly, the obtaining circuit is configured to read the matrix A1, the matrix B2, and the index matrix from the first memory.

According to a fourth aspect, a circuit for performing a matrix multiplication operation is provided. The circuit includes:

an obtaining circuit, configured to obtain a matrix B1, a matrix A2, and an index matrix, where the matrix B1 is a matrix with k rows and n columns, the matrix A2 is a matrix with m rows and t columns, the index matrix is a matrix with m rows and t columns, k, n, m, and t are all positive integers, and t is less than or equal to k;

a data selection circuit, configured to generate m matrices B2 based on the index matrix and the matrix B1, where the m matrices B2 are all matrices with t rows and n columns, the m matrices B2 are in a one-to-one correspondence with the m rows of the index matrix in sequence, t rows of each matrix B2 are in a one-to-one correspondence with t elements in a corresponding row of the index matrix in sequence, and each row of each matrix B2 is a row indicated in the matrix B1 by a corresponding element in the index matrix; and a computing unit array, configured to generate a matrix C based on the matrix A2 and the m matrices B2, where the matrix C is a matrix with m rows and n columns, the m rows of the matrix C are in a one-to-one correspondence with the m rows of the matrix A2 in sequence, the m rows of the matrix C are in a one-to-one correspondence with the m matrices B2 in sequence, and each row of the matrix C is a product of a corresponding row of the matrix A2 and a corresponding matrix B2.

When configured to obtain the matrix A2 and the index matrix, the obtaining circuit is configured to:

obtain a matrix A1, where the matrix A1 is a matrix with m rows and k columns, elements in each of the m rows of the matrix A1 are sequentially grouped into groups whose quantity is a preset value, a quantity of elements in each group is k1, a quantity of non-zero elements in each group of elements is less than or equal to k2, the preset value is k/k1, k is greater than or equal to k1 and k can be exactly divided by k1, and k1 is greater than or equal to k2 and k1 can be exactly divided by k2;

generate the matrix A2 based on the matrix A1, where the m rows of the matrix A2 are in a one-to-one correspondence with the m rows of the matrix A1 in sequence, and elements in each row of the matrix A2 include all non-zero elements in groups that are sequentially arranged in a corresponding row of the matrix A1 and whose quantity is the preset value; and generate the index matrix based on the matrix A1, where them rows of the index matrix are in a one-to-one correspondence with the m rows of the matrix A2 in sequence, and elements in each row of the index matrix are column indexes, in the matrix A1, of all elements that are sequentially arranged in a corresponding row of the matrix A2.

It should be noted that, for any non-zero element in the matrix A2, a column index of the non-zero element in the matrix A1 is a column number of a column to which the non-zero element belongs in the matrix A1; and for any element that is zero in the matrix A2, a column index of the element that is zero in the matrix A1 is a first character.

In addition, for any element in the index matrix, when the element in the index matrix is not the first character, a row indicated in the matrix B1 by the element in the index matrix is a row that is in all the rows of the matrix B1 and whose row number is the element in the index matrix; or when the element in the index matrix is the first character, elements in a row of a matrix B2 corresponding to the element in the index matrix are n second characters.

In addition, the matrix A1 is obtained through training by using a neural network.

Further, the circuit further includes a first memory, and the first memory is configured to store the matrix B1, the matrix A2, and the index matrix; and correspondingly, the obtaining circuit is configured to read the matrix B1, the matrix A2, and the index matrix from the first memory.

According to a fifth aspect, a SOC is provided. The SOC includes the circuit for performing a matrix multiplication operation according to the third aspect. The SOC further includes a processing core, configured to control the circuit for performing a matrix multiplication operation.

Further, the SOC further includes a second memory, and the second memory is configured to store the matrix A1, the matrix B2, and the index matrix; and correspondingly, the obtaining circuit is configured to read the matrix A1, the matrix B2, and the index matrix from the second memory.

According to a sixth aspect, a SOC is provided. The SOC includes the circuit for performing a matrix multiplication operation according to the fourth aspect. The SOC further includes a processing core, configured to control the circuit for performing a matrix multiplication operation.

Further, the SOC further includes a second memory, and the second memory is configured to store the matrix B1, the matrix A2, and the index matrix; and correspondingly, the obtaining circuit is configured to read the matrix B1, the matrix A2, and the index matrix from the second memory.

According to a seventh aspect, a computer-readable storage medium is provided. The computer-readable storage medium stores an instruction, and when the instruction is run on a computer, the computer is enabled to perform the method for performing a matrix multiplication operation according to the first aspect.

According to an eighth aspect, a computer-readable storage medium is provided. The computer-readable storage medium stores an instruction, and when the instruction is run on a computer, the computer is enabled to perform the method for performing a matrix multiplication operation according to the second aspect.

According to a ninth aspect, a computer program product including an instruction is provided. When the instruction is run on a computer, the computer is enabled to perform the method for performing a matrix multiplication operation according to the first aspect.

According to a tenth aspect, a computer program product including an instruction is provided. When the instruction is run on a computer, the computer is enabled to perform the method for performing a matrix multiplication operation according to the second aspect.

Technical effects achieved in the third aspect, the fifth aspect, the seventh aspect, and the ninth aspect are similar to technical effects achieved by corresponding technical means in the first aspect. Details are not described herein again.

Technical effects achieved in the fourth aspect, the sixth aspect, the eighth aspect, and the tenth aspect are similar to technical effects achieved by corresponding technical means in the second aspect. Details are not described herein again.

The technical solutions provided in this application can bring at least the following beneficial effects:

The matrix B1, the matrix A2, and the index matrix are obtained. Then, the m matrices B2 are generated based on the index matrix and the matrix B1. Because required data can be read based on the index matrix at a time from the matrix B1 stored in the memory, not only a memory access bandwidth required for data reading can be greatly reduced, but also an address conflict problem that may occur when data is read from the memory can be eliminated. Finally, the matrix C is generated based on the matrix A2 and the m matrices B2. Because the sizes of the m matrices B2 are the same, when the m rows of the matrix A2 are respectively multiplied by the m matrices B2, the multiplication operations of the m rows of the matrix A2 and the m matrices B2 may be performed in parallel, and may be completed within a same time, so that an operation time can be reduced, and operation efficiency can be improved. In the embodiments of this application, because the matrix multiplication operation can be completed by reading data from the matrix B1 only once, data reusability can be maximized, and processing resources can be saved.

BRIEF DESCRIPTION OF DRAWINGS

FIG. 1 is a schematic diagram of a matrix B1 according to an embodiment of this application;

FIG. 2 is a schematic diagram of a matrix A1 according to an embodiment of this application;

FIG. 3 is a flowchart of a method for performing a matrix multiplication operation according to an embodiment of this application;

FIG. 4 is a schematic diagram of another matrix B1 according to an embodiment of this application;

FIG. 5 is a schematic diagram of a matrix B2 according to an embodiment of this application;

FIG. 6 is a schematic diagram of an index matrix according to an embodiment of this application;

FIG. 7 is a schematic diagram of another matrix A1 according to an embodiment of this application;

FIG. 8A to FIG. 8D are schematic diagrams of n matrices A2 according to an embodiment of this application;

FIG. 9 is a schematic diagram of a matrix C according to an embodiment of this application;

FIG. 14 is a schematic diagram of still another matrix B1 according to an embodiment of this application;

FIG. 15 is a schematic diagram of m matrices B2 according to an embodiment of this application;

FIG. 16 is a schematic diagram of another matrix C according to an embodiment of this application;

DESCRIPTION OF EMBODIMENTS

Figures 10, 11:
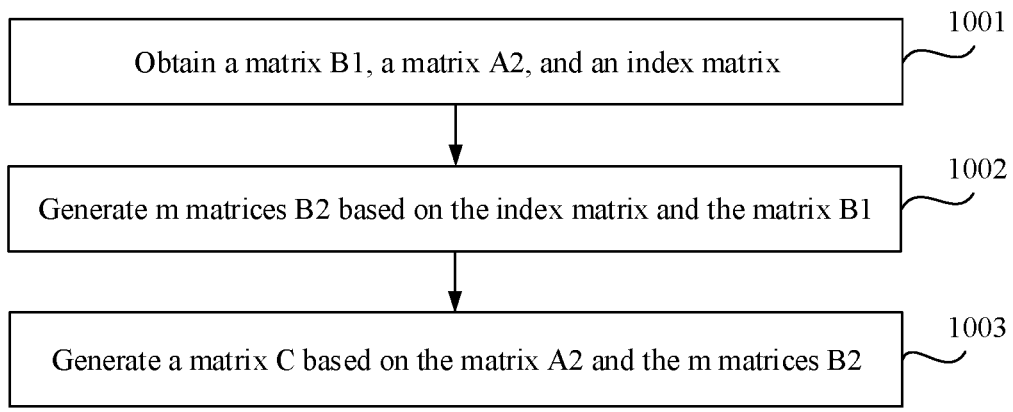
FIG. 10 is a flowchart of another method for performing a matrix multiplication operation according to an embodiment of this application.
FIG. 11 is a schematic diagram of still another matrix A1 according to an embodiment of this application.

To make the objectives, technical solutions, and advantages of this application clearer, the following further describes the embodiments of this application in detail with reference to the accompanying drawings.

Before the embodiments of this application are described in detail, an application scenario related to the embodiments of this application is described.

Currently, an artificial intelligence technology is widely applied to terminals, edge, cloud, and the like to implement functions such as image recognition, target detection, and voice translation. The artificial intelligence technology is usually implemented by using a deep learning network. For the deep learning network (for example, a neural network), operators that have relatively large impact on performance and have a relatively large computing workload, for example, convolution, inner product, or other operators whose computing workload may account for 99%, may be all expanded into operations of multiplying one matrix by another matrix. Certainly, as a common data expression form, the operation of multiplying one matrix by another matrix is also often applied to another field. A method for performing a matrix multiplication operation provided in the embodiments of this application is applied to an operation scenario of multiplying one matrix by another matrix in a deep learning network or another field.

Next, the method for performing a matrix multiplication operation provided in the embodiments of this application is described.

It should be noted that, before the method for performing a matrix multiplication operation provided in the embodiments of this application is performed, a matrix that meets conditional sparsity may be obtained first. For example, a developer may obtain, by controlling a training process of a deep learning network, the matrix that meets the conditional sparsity. Certainly, the matrix that meets the conditional sparsity may alternatively be obtained in another manner. This is not limited in the embodiments of this application.

For a case in which a matrix A1 is multiplied by a matrix B1, it is assumed that the matrix A1 is a matrix with m rows and k columns, the matrix B1 is a matrix with k rows and n columns, and m, k, and n are all positive integers.

When the matrix B1 meets the conditional sparsity, it means that elements in each of the n columns of the matrix B1 are sequentially grouped into groups whose quantity is a preset value, a quantity of elements in each group is k1, a quantity of non-zero elements in each group of elements is less than or equal to k2, the preset value is a positive integer, the preset value is k/k1, k is greater than or equal to k1 and k can be exactly divided by k1, and k1 is greater than or equal to k2 and k1 can be exactly divided by k2. For example, k=16, n=16, k1=8, k2=2, and the preset value is 2. To be specific, the matrix B1 is a matrix with 16 rows and 16 columns, elements in each of the 16 columns of the matrix B1 are sequentially grouped into two groups, a quantity of elements in each group is 8, and a quantity of non-zero elements in each group of elements is less than or equal to 2. In this case, the matrix B1 may be shown in FIG. 1. In this case, every eight consecutive elements in each of the 16 columns of the matrix B1 sparsely include no more than two non-zero elements, and a corresponding conditional sparsity rate is 25%.

When the matrix A1 meets the conditional sparsity, it means that elements in each of the m rows of the matrix A1 are sequentially grouped into groups whose quantity is a preset value, a quantity of elements in each group is k1, a quantity of non-zero elements in each group of elements is less than or equal to k2, the preset value is a positive integer, the preset value is k/k1, k is greater than or equal to k1 and k can be exactly divided by k1, and k1 is greater than or equal to k2 and k1 can be exactly divided by k2. For example, m=5, k=4, k1=2, k2=1, and the preset value is 2. To be specific, the matrix A1 is a matrix with five rows and four columns, elements in each of the five rows of the matrix A1 are sequentially grouped into two groups, a quantity of elements in each group is 2, and a quantity of non-zero elements in each group of elements is less than or equal to 1. In this case, the matrix A1 may be shown in FIG. 2. In this case, every two consecutive elements in each of the five rows of the matrix A1 sparsely include no more than one non-zero element, and a corresponding conditional sparsity rate is 50%.

It should be noted that, in the case in which the matrix A1 is multiplied by the matrix B1, if the matrix B1 is a matrix that meets the conditional sparsity, a product of the matrix A1 and the matrix B1 may be determined by using a method for performing a matrix multiplication operation provided in the following embodiment in FIG. 3. If the matrix A1 is a matrix that meets the conditional sparsity, a product of the matrix A1 and the matrix B1 may be determined by using a method for performing a matrix multiplication operation provided in the following embodiment in FIG. 10.

FIG. 3 is a flowchart of a method for performing a matrix multiplication operation according to an embodiment of this application. Referring to FIG. 3, the method includes the following operations.

Operation 301: Obtain a matrix A1, a matrix B2, and an index matrix.

It should be noted that, the matrix A1 is a matrix with m rows and k columns, and both m and k are positive integers. The matrix A1 may be a multiplicand in an operation, obtained after any operator (for example, a convolution or inner product operator) in a deep learning network is expanded, of multiplying one matrix by another matrix, and the matrix A1 may be a data matrix. Certainly, the matrix A1 may alternatively be a multiplicand in an operation, in another application, of multiplying one matrix by another matrix. This is not limited in this embodiment of this application.

In addition, the matrix B2 is a matrix with t rows and n columns, both t and n are positive integers, and t is less than or equal to k. The matrix B2 includes all non-zero elements (valid data) in a matrix B1. The matrix B1 is a matrix with k rows and n columns. The matrix B1 may be a multiplier in an operation, obtained after any operator in the deep learning network is expanded, of multiplying one matrix by another matrix, and the matrix B1 may be a parameter matrix. Certainly, the matrix B1 may alternatively be a multiplier in an operation, in another application, of multiplying one matrix by another matrix. This is not limited in this embodiment of this application.

In addition, the index matrix is a matrix with t rows and n columns. The index matrix includes indexes, in the matrix B1, of elements in the matrix B2, or in other words, includes indexes, in the matrix B1, of all the non-zero elements in the matrix B1.

In an embodiment, when the matrix A1 is obtained, the matrix A1 may be directly read from a memory. When the matrix B2 and the index matrix are obtained, the matrix B2 and the index matrix may be directly read from the memory. Alternatively, the matrix B1 may be obtained first, and then the matrix B2 and the index matrix are generated based on the matrix B1. In an embodiment, when the matrix B2 and the index matrix are generated based on the matrix B1, the matrix B2 may be generated based on the matrix B1, and the index matrix may be generated based on the matrix B1. Alternatively, the matrix B2 is first generated based on B1, and then the index matrix is generated based on the matrix B1 and the matrix B2. A specific generation algorithm is not limited, provided that final generated matrices can meet definition requirements of the matrices.

When the matrix B1 is obtained, the matrix B1 may be directly read from the memory.

It should be noted that, the matrix B1 may be a matrix that meets conditional sparsity. To be specific, elements in each of the n columns of the matrix B1 are sequentially grouped into groups whose quantity is a preset value, a quantity of elements in each group is k1, a quantity of non-zero elements in each group of elements is less than or equal to k2, a preset value is k/k1 (equal to a value obtained by dividing t by k2), k is greater than or equal to k1 and k can be exactly divided by k1, and k1 is greater than or equal to k2 and k1 can be exactly divided by k2.

In addition, the matrix B1 may be obtained through training by using a neural network. For example, in a deep learning scenario, by controlling a training process of a deep learning network, distribution of parameters of convolution, inner product, or other operators may be trained to follow a distribution rule that meets the conditional sparsity, to obtain a parameter matrix that meets the conditional sparsity as the matrix B1. Certainly, the matrix B1 may alternatively be obtained in another manner. This is not limited in this embodiment of this application.

In addition, data types of elements in the matrix A1 and the matrix B1 may be preset based on an actual requirement, for example, may be an integer, a floating point, or any customized format. Moreover, values of m, k, n, k1, k2, and the preset value may also be preset based on an actual requirement, for example, may be properly determined based on a sparsity degree of a neural network and a computing capability of hardware. This is not limited in this embodiment of this application.

For example, k=16, n=16, k1=16, k2=4, and the preset value is 1. To be specific, the matrix B1 is a matrix with 16 rows and 16 columns, elements in each of the 16 columns of the matrix B1 are sequentially grouped into one group, a quantity of elements in each group is 16, and a quantity of non-zero elements in each group of elements is less than or equal to 4. In this case, the matrix B1 may be shown in FIG. 4. In this case, every 16 consecutive elements in each of the 16 columns of the matrix B1 sparsely include no more than four non-zero elements, and a corresponding conditional sparsity rate is 25%.

The n columns of the matrix B2 are in a one-to-one correspondence with the n columns of the matrix B1 in sequence, and elements in each column of the matrix B2 include all non-zero elements in groups that are sequentially arranged in a corresponding column of the matrix B1 and whose quantity is the preset value. To be specific, for each of the n columns of the matrix B1, for example, for an $i^{th}$ column in the n columns of the matrix B1, from groups that are in the $i^{th}$ column of the matrix B2 and whose quantity is the preset value, k2 elements including all non-zero elements in each group of elements are sequentially selected as an $i^{th}$ column of the matrix B2, to obtain the matrix B2, where i is an integer greater than or equal to 1 and less than or equal to n.

For example, k=16, n=16, k1=16, k2=4, and the preset value is 1. In this case, the matrix B1 may be shown in FIG. 4. Then, from one group of elements in a first column of the matrix B1, four elements including all non-zero elements in the group of elements may be sequentially selected as a first column of the matrix B2; from one group of elements in a second column of the matrix B1, four elements including all non-zero elements in the group of elements may be sequentially selected as a second column of the matrix B2; and so on, until from one group of elements in a sixteenth column of the matrix B1, four elements including all non-zero elements in the group of elements are sequentially selected as a sixteenth column of the matrix B2. In this way, a matrix B2 shown in FIG. 5 may be obtained. In this case, the matrix B2 is a matrix with 4 rows and 16 columns, and includes all the non-zero elements in the matrix B1.

The n columns of the index matrix are in a one-to-one correspondence with the n columns of the matrix B2 in sequence, and elements in each column of the index matrix are row indexes, in the matrix B1, of all elements that are sequentially arranged in a corresponding column of the matrix B2. To be specific, for each of the n columns of the matrix B2, for example, for the $i^{th}$ column in then columns of the matrix B2, a row index, in the matrix B1, of each element in all elements in the $i^{th}$ column of the matrix B2 is sequentially used as an $i^{th}$ column of the index matrix, to obtain the index matrix.

It should be noted that, in an embodiment of this application, the concept of conditional sparsity is introduced, so that a quantity of non-zero elements in each of the n columns of the matrix B1 can be controlled within a specific range. In this way, a data index range can be effectively controlled, so that a scale of the index matrix can be effectively reduced, and engineering implementability can be ensured. In addition, in this embodiment of this application, the matrix multiplication operation can be completed subsequently by using the only one index matrix. Therefore, fewer logical resources are consumed.

It should be noted that, for any non-zero element in the matrix B2, a row index of the non-zero element in the matrix B1 is a row number of a row to which the non-zero element belongs in the matrix B1. For any element that is zero in the matrix B2, a row index of the element that is zero in the matrix B1 is a first character.

In addition, introducing the first character may meet a matrix element alignment requirement. The first character may be preset. In an embodiment, the first character may be any value. For example, the first character may be X, Y, or the like. This is not limited in this embodiment of this application.

For example, k=16, n=16, k1=16, k2=4, the preset value is 1, and the first character is X. In this case, the matrix B1 may be shown in FIG. 4, and the matrix B2 may be shown in FIG. 5. Then, a row index, in the matrix B1, of each of the four elements in the first column of the matrix B2 is sequentially used as a first column of the index matrix; a row index, in the matrix B1, of each of the four elements in the second column of the matrix B2 is sequentially used as a second column of the index matrix; and so on, until a row index, in the matrix B1, of each of the four elements in the sixteenth column of the matrix B2 is sequentially used as a sixteenth column of the index matrix. In this way, an index matrix shown in FIG. 6 may be obtained. In this case, the index matrix is a matrix with 4 rows and 16 columns, and includes indexes, in the matrix B1, of all the non-zero elements in the matrix B1.

Operation 302: Generate n matrices A2 based on the index matrix and the matrix A1.

It should be noted that, the n matrices A2 are all matrices with m rows and t columns, the n matrices A2 are in a one-to-one correspondence with the n columns of the index matrix in sequence, t columns of each matrix A2 are in a one-to-one correspondence with t elements in a corresponding column of the index matrix in sequence, and each column of each matrix A2 is a column indicated in the matrix A1 by a corresponding element in the index matrix. To be specific, for each of t elements in each of the n columns of the index matrix, for example, for a $j^{th}$ element in the $i^{th}$ column of the index matrix, a column indicated in the matrix A1 by the $j^{th}$ element in the $i^{th}$ column of the index matrix is used as a $j^{th}$ column of an $i^{th}$ matrix A2 in the n matrices A2, to obtain the n matrices A2, where j is an integer greater than or equal to 1 and less than or equal to t.

It should be noted that, in an embodiment of this application, elements in t columns of the matrix A1 are directly read based on the t elements in each column of the index matrix to constitute a matrix A2. In this case, because distribution of to-be-read data in the matrix A1 is relatively regular and centralized, when the matrix A1 is stored in a memory, the k columns of the matrix A1 may be respectively stored at a plurality of addresses in the memory. In this case, required data may be read from the memory at a time based on the index matrix, so that not only a memory access bandwidth required for data reading can be greatly reduced, but also an address conflict problem that may occur when data is read from the memory can be eliminated.

It should be noted that, for any element in the index matrix, when the element in the index matrix is not the first character, a column indicated in the matrix A1 by the element in the index matrix is a column that is in all the columns of the matrix A1 and whose column number is the element in the index matrix; or when the element in the index matrix is the first character, elements in a column of a matrix A2 corresponding to the element in the index matrix are m second characters. To be specific, when the $j^{th}$ element in the $i^{th}$ column of the index matrix is not the first character, a column that is in all the columns of the matrix A1 and whose column number is the $j^{th}$ element may be used as the $j^{th}$ column of the $i^{th}$ matrix A2; and when the $j^{th}$ element in the $i^{th}$ column of the index matrix is the first character, the m second characters are used as the $j^{th}$ column of the $i^{th}$ matrix A2.

In addition, the second character may be preset. In an embodiment, the second character may be any value. For example, the second character may be 0, X, or any element in the matrix A1. This is not limited in this embodiment of this application.

For example, m=16, k=16, n=16, t=4, and both the first character and the second character are X. In this case, the index matrix may be shown in FIG. 6, and the matrix A1 may be shown in FIG. 7. Then, a column indicated in the matrix A1 by a first element in the first column of the index matrix is used as a first column of a first matrix A2, a column indicated in the matrix A1 by a second element in the first column of the index matrix is used as a second column of the first matrix A2, a column indicated in the matrix A1 by a third element in the first column of the index matrix is used as a third column of the first matrix A2, and a column indicated in the matrix A1 by a fourth element in the first column of the index matrix is used as a fourth column of the first matrix A2, to obtain the first matrix A2, and so on, until a column indicated in the matrix A1 by a first element in the sixteenth column of the index matrix is used as a first column of a sixteenth matrix A2, a column indicated in the matrix A1 by a second element in the sixteenth column of the index matrix is used as a second column of the sixteenth matrix A2, a column indicated in the matrix A1 by a third element in the sixteenth column of the index matrix is used as a third column of the sixteenth matrix A2, and a column indicated in the matrix A1 by a fourth element in the sixteenth column of the index matrix is used as a fourth column of the sixteenth matrix A2, to obtain the sixteenth matrix A2. In this way, 16 matrices A2 shown in FIG. 8A to FIG. 8D may be obtained. The 16 matrices A2 are all matrices with 16 rows and 4 columns.

Operation 303: Generate a matrix C based on the n matrices A2 and the matrix B2.

It should be noted that, the matrix C is a matrix with m rows and n columns, and the matrix C is a product of the matrix A1 and the matrix B1. The n columns of the matrix C are in a one-to-one correspondence with the n matrices A2 in sequence, the n columns of the matrix C are in a one-to-one correspondence with the n columns of the matrix B2 in sequence, and each column of the matrix C is a product of a corresponding matrix A2 and a corresponding column of the matrix B2. To be specific, for each of the n columns of the matrix C, for example, for an $i^{th}$ column of the matrix C, a product of the $i^{th}$ matrix A2 and the $i^{th}$ column of the matrix B2 is used as the $i^{th}$ column of the matrix C, to obtain the matrix C.

It should be noted that, in an embodiment of this application, the n matrices A2 may be read from the matrix A1 at a time based on the index matrix, and then the n matrices A2 may be respectively multiplied by the n columns of the matrix B2 to obtain the matrix C. Because the matrix multiplication operation can be completed by reading data from the matrix A1 only once, data reusability can be maximized, and processing resources can be saved. In addition, when the n matrices A2 are respectively multiplied by the n columns of the matrix B2, because sizes of the n matrices A2 are the same, multiplication operations of the n matrices A2 and the n columns of the matrix B2 may be performed in parallel, and may be completed within a same time, so that an operation time can be reduced, and operation efficiency can be improved.

For example, m=16, n=16, and t=4. In this case, the matrix B2 may be shown in FIG. 5, and the 16 matrices A2 may be shown in FIG. 8A to FIG. 8D. Then, a product of the first matrix A2 and the first column of the matrix B2 may be used as a first column of the matrix C, a product of the second matrix A2 and the second column of the matrix B2 may be used as a second column of the matrix C, and so on, until a product of the sixteenth matrix A2 and the sixteenth column of the matrix B2 is used as a sixteenth column of the matrix C. In this way, a matrix C shown in FIG. 9 may be obtained. In this case, the matrix C is a matrix with 16 rows and 16 columns.

It should be noted that, in an embodiment of this application, the concept of conditional sparsity is introduced in a matrix multiplication operation process, and then a multiplication operation is performed in the foregoing manner on the matrix A1 and the matrix B1 that meets the conditional sparsity, so that computing performance can be greatly improved. A multiple in improving the computing performance is a reciprocal of a conditional sparsity rate of the matrix B1. For example, if the conditional sparsity rate of the matrix B1 is 25%, the computing performance may be improved four times.

In an embodiment of this application, the matrix A1, the matrix B2, and the index matrix are obtained. Then, the n matrices A2 are generated based on the index matrix and the matrix A1. Because required data can be read based on the index matrix at a time from the matrix A1 stored in the memory, not only a memory access bandwidth required for data reading can be greatly reduced, but also an address conflict problem that may occur when data is read from the memory can be eliminated. Finally, the matrix C is generated based on the n matrices A2 and the matrix B2. Because the sizes of the n matrices A2 are the same, when the n matrices A2 are respectively multiplied by the n columns of the matrix B2, the multiplication operations of the n matrices A2 and the n columns of the matrix B2 may be performed in parallel, and may be completed within a same time, so that an operation time can be reduced, and operation efficiency can be improved. In an embodiment of this application, because the matrix multiplication operation can be completed by reading data from the matrix A1 only once, data reusability can be maximized, and processing resources can be saved.

FIG. 10 is a flowchart of a method for performing a matrix multiplication operation according to an embodiment of this application. Referring to FIG. 10, the method includes the following operations.

Operation 1001: Obtain a matrix B1, a matrix A2, and an index matrix.

It should be noted that, the matrix B1 is a matrix with k rows and n columns, and both k and n are positive integers. The matrix B1 may be a multiplier in an operation, obtained after any operator (for example, a convolution or inner product operator) in a deep learning network is expanded, of multiplying one matrix by another matrix, and the matrix B1 may be a data matrix. Certainly, the matrix B1 may alternatively be a multiplier in an operation, in another application, of multiplying one matrix by another matrix. This is not limited in this embodiment of this application.

In addition, the matrix A2 is a matrix with m rows and t columns, both m and t are positive integers, and t is less than or equal to k. The matrix A2 includes all non-zero elements (valid data) in a matrix A1. The matrix A1 is a matrix with m rows and k columns. The matrix A1 may be a multiplicand in an operation, obtained after any operator in the deep learning network is expanded, of multiplying one matrix by another matrix, and the matrix A1 may be a parameter matrix. Certainly, the matrix A1 may alternatively be a multiplicand in an operation, in another application, of multiplying one matrix by another matrix. This is not limited in this embodiment of this application.

In addition, the index matrix is a matrix with m rows and t columns. The index matrix includes indexes, in the matrix A1, of elements in the matrix A2, or in other words, includes indexes, in the matrix A1, of all the non-zero elements in the matrix A1.

In an embodiment, when the matrix B1 is obtained, the matrix B1 may be directly read from a memory. When the matrix A2 and the index matrix are obtained, the matrix A2 and the index matrix may be directly read from the memory. Alternatively, the matrix A1 may be obtained first, and then the matrix A2 and the index matrix are generated based on the matrix A1. In an embodiment, when the matrix A2 and the index matrix are generated based on the matrix A1, the matrix A2 may be generated based on the matrix A1, and the index matrix may be generated based on the matrix A1. Alternatively, the matrix A2 is first generated based on A1, and then the index matrix is generated based on the matrix A1 and the matrix A2. A specific generation algorithm is not limited, provided that final generated matrices can meet definition requirements of the matrices.

When the matrix A1 is obtained, the matrix A1 may be directly read from the memory.

It should be noted that, the matrix A1 may be a matrix that meets conditional sparsity. To be specific, elements in each of the m rows of the matrix A1 are sequentially grouped into groups whose quantity is a preset value, a quantity of elements in each group is k1, a quantity of non-zero elements in each group of elements is less than or equal to k2, a preset value is k/k1 (equal to a value obtained by dividing t by k2), k is greater than or equal to k1 and k can be exactly divided by k1, and k1 is greater than or equal to k2 and k1 can be exactly divided by k2.

In addition, the matrix A1 may be obtained through training by using a neural network. For example, in a deep learning scenario, by controlling a training process of a deep learning network, distribution of parameters of convolution, inner product, or other operators may be trained to follow a distribution rule that meets the conditional sparsity, to obtain a parameter matrix that meets the conditional sparsity as the matrix A1. Certainly, the matrix A1 may alternatively be obtained in another manner. This is not limited in this embodiment of this application.

In addition, data types of elements in the matrix A1 and the matrix B1 may be preset based on an actual requirement, for example, may be an integer, a floating point, or any customized format. Moreover, values of m, k, n, k1, k2, and the preset value may also be preset based on an actual requirement, for example, may be properly determined based on a sparsity degree of a neural network and a computing capability of hardware. This is not limited in this embodiment of this application.

For example, m=5, k=4, k1=4, k2=2, and the preset value is 1. To be specific, the matrix A1 is a matrix with five rows and four columns, elements in each of the five rows of the matrix A1 are sequentially grouped into one group, a quantity of elements in each group is 4, and a quantity of non-zero elements in each group of elements is less than or equal to 2. In this case, the matrix A1 may be shown in FIG. 11. In this case, every four consecutive elements in each of the five rows of the matrix A1 sparsely include no more than two non-zero elements, and a corresponding conditional sparsity rate is 50%.

The m rows of the matrix A2 are in a one-to-one correspondence with the m rows of the matrix A1 in sequence, and elements in each row of the matrix A2 include all non-zero elements in groups that are sequentially arranged in a corresponding row of the matrix A1 and whose quantity is the preset value. To be specific, for each of the m rows of the matrix A1, for example, for an $i^{th}$ row in the m rows of the matrix A1, from groups that are in the $i^{th}$ row of the matrix A1 and whose quantity is the preset value, k2 elements including all non-zero elements in each group of elements are sequentially selected as an $i^{th}$ row of the matrix A2, where i is an integer greater than or equal to 1 and less than or equal to m.

Figure 12:
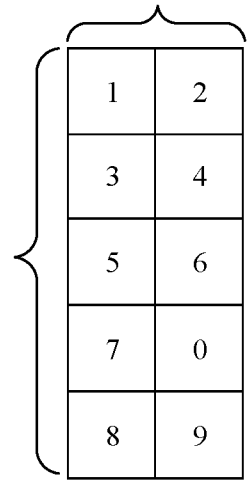
FIG. 12 is a schematic diagram of a matrix A2 according to an embodiment of this application.

For example, m=5, k=4, k1=4, k2=2, and the preset value is 1. In this case, the matrix A1 may be shown in FIG. 11. Then, from one group of elements in a first row of the matrix A1, two elements including all non-zero elements in the group of elements may be sequentially selected as a first row of the matrix A2; from one group of elements in a second row of the matrix A1, two elements including all non-zero elements in the group of elements may be sequentially selected as a second row of the matrix A2; and so on, until from one group of elements in a fifth row of the matrix A1, two elements including all non-zero elements in the group of elements may be sequentially selected as a fifth row of the matrix A2. In this way, a matrix A2 shown in FIG. 12 may be obtained. In this case, the matrix A2 is a matrix with five rows and two columns, and includes all the non-zero elements in the matrix A1.

The m rows of the index matrix are in a one-to-one correspondence with the m rows of the matrix A2 in sequence, and elements in each row of the index matrix are column indexes, in the matrix A1, of all elements that are sequentially arranged in a corresponding row of the matrix A2. To be specific, for each of the m rows of the matrix A2, for example, for the $i^{th}$ row in the m rows of the matrix A2, a column index, in the matrix A1, of each element in all elements in the $i^{th}$ row of the matrix A2 is sequentially used as an $i^{th}$ row of the index matrix, to obtain the index matrix.

It should be noted that, in an embodiment of this application, the concept of conditional sparsity is introduced, so that a quantity of non-zero elements in each of the m rows of the matrix A1 can be controlled within a specific range. In this way, a data index range can be effectively controlled, so that a scale of the index matrix can be effectively reduced, and engineering implementability can be ensured. In addition, in this embodiment of this application, the matrix multiplication operation can be completed subsequently by using the only one index matrix. Therefore, fewer logical resources are consumed.

It should be noted that, for any non-zero element in the matrix A2, a column index of the non-zero element in the matrix A1 is a column number of a column to which the non-zero element belongs in the matrix A1. For any element that is zero in the matrix A2, a column index of the element that is zero in the matrix A1 is a first character.

In addition, introducing the first character may meet a matrix element alignment requirement. The first character may be preset. In an embodiment, the first character may be any value. For example, the first character may be X, Y, or the like. This is not limited in this embodiment of this application.

Figure 13:
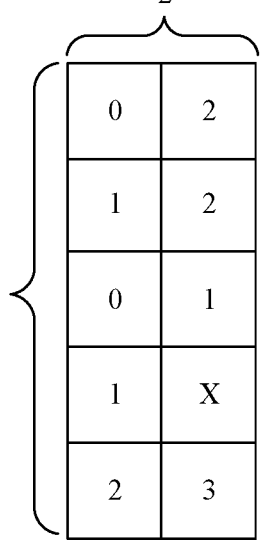
FIG. 13 is a schematic diagram of another index matrix according to an embodiment of this application.

For example, m=5, k=4, k1=4, k2=2, the preset value is 1, and the first character is X. In this case, the matrix A1 may be shown in FIG. 11, and the matrix A2 may be shown in FIG. 12. Then, a column index, in the matrix A1, of each of the two elements in the first row of the matrix A2 is sequentially used as a first row of the index matrix; a column index, in the matrix A1, of each of the two elements in the second row of the matrix A2 is sequentially used as a second row of the index matrix; and so on, until a column index, in the matrix A1, of each of the two elements in the fifth row of the matrix A2 is sequentially used as a fifth row of the index matrix. In this way, an index matrix shown in FIG. 13 may be obtained. In this case, the index matrix is a matrix with five rows and two columns, and includes indexes, in the matrix A1, of all the non-zero elements in the matrix A1.

Operation 1002: Generate m matrices B2 based on the index matrix and the matrix B1.

It should be noted that, the m matrices B2 are all matrices with t rows and n columns, the m matrices B2 are in a one-to-one correspondence with the m rows of the index matrix in sequence, t rows of each matrix B2 are in a one-to-one correspondence with t elements in a corresponding row of the index matrix in sequence, and each row of each matrix B2 is a row indicated in the matrix B1 by a corresponding element in the index matrix. To be specific, for each of t elements in each of the m rows of the index matrix, for example, for a $j^{th}$ element in the $i^{th}$ row of the index matrix, a row indicated in the matrix B1 by the $j^{th}$ element in the $i^{th}$ row of the index matrix is used as a $j^{th}$ row of an $i^{th}$ matrix B2 in the m matrices B2, to obtain the m matrices B2, where j is an integer greater than or equal to 1 and less than or equal to t.

It should be noted that, in an embodiment of this application, elements in t rows of the matrix B1 are directly read based on the t elements in each row of the index matrix to constitute a matrix B2. In this case, because distribution of to-be-read data in the matrix B1 is relatively regular and centralized, when the matrix B1 is stored in a memory, the k rows of the matrix B1 may be respectively stored at a plurality of addresses in the memory. In this case, required data may be read from the memory at a time based on the index matrix, so that not only a memory access bandwidth required for data reading can be greatly reduced, but also an address conflict problem that may occur when data is read from the memory can be eliminated.

It should be noted that, for any element in the index matrix, when the element in the index matrix is not the first character, a row indicated in the matrix B1 by the element in the index matrix is a row that is in all the rows of the matrix B1 and whose row number is the element in the index matrix; or when the element in the index matrix is the first character, elements in a row of a matrix B2 corresponding to the element in the index matrix are n second characters. To be specific, when the $j^{th}$ element in the $i^{th}$ row of the index matrix is not the first character, a row that is in all the rows of the matrix B1 and whose row number is the $j^{th}$ element may be used as the $j^{th}$ row of the $i^{th}$ matrix B2; and when the $j^{th}$ element in the $i^{th}$ row of the index matrix is the first character, the n second characters are used as the $j^{th}$ row of the $i^{th}$ matrix B2.

In addition, the second character may be preset. In an embodiment, the second character may be any value. For example, the second character may be 0, X, or any element in the matrix B1. This is not limited in this embodiment of this application.

For example, m=5, k=4, n=3, t=2, and both the first character and the second character are X. In this case, the index matrix may be shown in FIG. 13, and the matrix B1 may be shown in FIG. 14. Then, a row indicated in the matrix B1 by a first element in the first row of the index matrix is used as a first row of a first matrix B2, and a row indicated in the matrix B1 by a second element in the first row of the index matrix is used as a second row of the first matrix B2, to obtain the first matrix B2, and so on, until a row indicated in the matrix B1 by a first element in the fifth row of the index matrix is used as a first row of a fifth matrix B2, and a row indicated in the matrix B1 by a second element in the fifth row of the index matrix is used as a second row of the fifth matrix B2, to obtain the fifth matrix B2. In this way, five matrices B2 shown in FIG. 15 may be obtained. The five matrices B2 are all matrices with two rows and three columns.

Operation 1003: Generate a matrix C based on the matrix A2 and the m matrices B2.

It should be noted that, the matrix C is a matrix with m rows and n columns, and the matrix C is a product of the matrix A1 and the matrix B1. The m rows of the matrix C are in a one-to-one correspondence with the m rows of the matrix A2 in sequence, the m rows of the matrix C are in a one-to-one correspondence with the m matrices B2 in sequence, and each row of the matrix C is a product of a corresponding row of the matrix A2 and a corresponding matrix B2. To be specific, for each of the m rows of the matrix C, for example, for an $i^{th}$ row of the matrix C, a product of the $i^{th}$ row of the matrix A2 and the $i^{th}$ matrix B2 is used as the $i^{th}$ row of the matrix C, to obtain the matrix C.

It should be noted that, in an embodiment of this application, the m matrices B2 may be read from the matrix B1 at a time based on the index matrix, and then the m rows of the matrix A2 may be respectively multiplied by the m matrices B2 to obtain the matrix C. Because the matrix multiplication operation can be completed by reading data from the matrix B1 only once, data reusability can be maximized, and processing resources can be saved. In addition, when the m rows of the matrix A2 are respectively multiplied by the m matrices B2, because sizes of the m matrices B2 are the same, multiplication operations of the m rows of the matrix A2 and the m matrices B2 may be performed in parallel, and may be completed within a same time, so that an operation time can be reduced, and operation efficiency can be improved.

For example, m=5, n=3, and t=2. In this case, the matrix A2 may be shown in FIG. 12, and the five matrices B2 may be shown in FIG. 15. Then, a product of the first row of the matrix A2 and the first matrix B2 may be used as a first row of the matrix C, a product of the second row of the matrix A2 and the second matrix B2 may be used as a second row of the matrix C, and so on, until a product of the fifth row of the matrix A2 and the fifth matrix B2 is used as a fifth row of the matrix C. In this way, a matrix C shown in FIG. 16 may be obtained. In this case, the matrix C is a matrix with five rows and three columns.

It should be noted that, in an embodiment of this application, the concept of conditional sparsity is introduced in a matrix multiplication operation process, and then a multiplication operation is performed on the matrix A1 that meets the conditional sparsity and the matrix B1 in the foregoing manner, so that computing performance can be greatly improved. A multiple in improving the computing performance is a reciprocal of a conditional sparsity rate of the matrix A1. For example, if the conditional sparsity rate of the matrix A1 is 50%, the computing performance may be improved twice.

In an embodiment of this application, the matrix B1, the matrix A2, and the index matrix are obtained. Then, the m matrices B2 are generated based on the index matrix and the matrix B1. Because required data can be read based on the index matrix at a time from the matrix B1 stored in the memory, not only a memory access bandwidth required for data reading can be greatly reduced, but also an address conflict problem that may occur when data is read from the memory can be eliminated. Finally, the matrix C is generated based on the matrix A2 and the m matrices B2. Because the sizes of the m matrices B2 are the same, when the m rows of the matrix A2 are respectively multiplied by the m matrices B2, the multiplication operations of the m rows of the matrix A2 and the m matrices B2 may be performed in parallel, and may be completed within a same time, so that an operation time can be reduced, and operation efficiency can be improved. In this embodiment of this application, because the matrix multiplication operation can be completed by reading data from the matrix B1 only once, data reusability can be maximized, and processing resources can be saved.

Next, a circuit for performing a matrix multiplication operation provided in the embodiments of this application is described.

Figure 17:
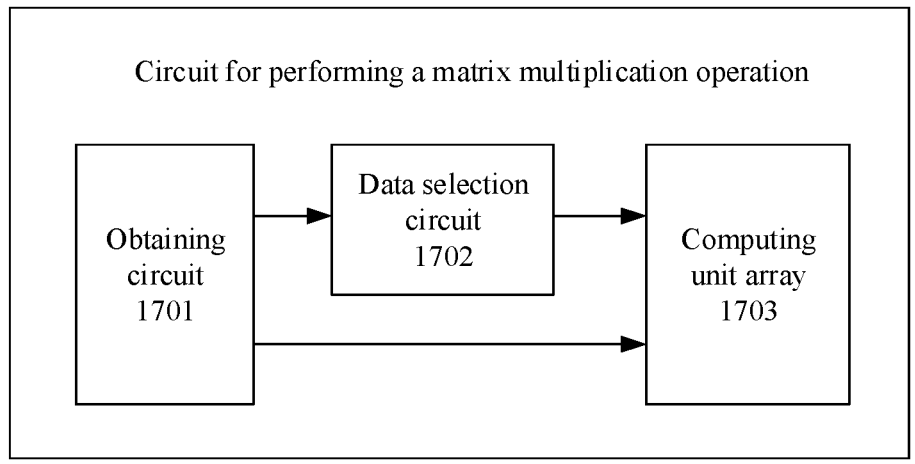
FIG. 17 is a schematic structural diagram of a circuit for performing a matrix multiplication operation according to an embodiment of this application.

FIG. 17 is a schematic structural diagram of a circuit for performing a matrix multiplication operation according to an embodiment of this application. The circuit for performing a matrix multiplication operation may be implemented by using a field-programmable gate array (FPGA), an application-specific integrated circuit (ASIC), or the like. Referring to FIG. 17, the circuit for performing a matrix multiplication operation includes: an obtaining circuit 1701, a data selection circuit 1702, and a computing unit array 1703.

The methods for performing a matrix multiplication operation provided in the embodiments in FIG. 3 and FIG. 10 are separately described below with reference to the circuit for performing a matrix multiplication operation shown in FIG. 17.

A process in which the circuit for performing a matrix multiplication operation implements the method for performing a matrix multiplication operation provided in the embodiment in FIG. 3 may include the following operations (1) to (3).

(1) The obtaining circuit 1701 obtains a matrix A1, a matrix B2, and an index matrix.

Figure 18:
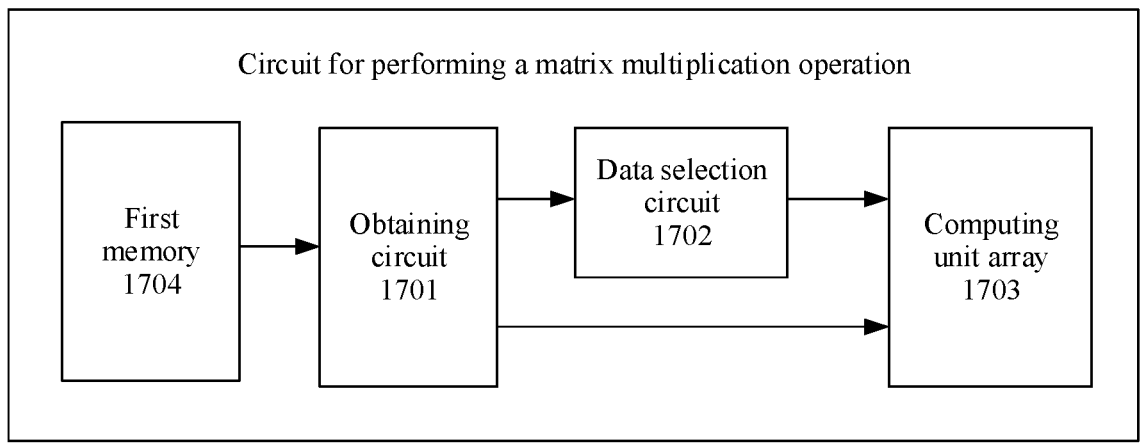
FIG. 18 is a schematic structural diagram of another circuit for performing a matrix multiplication operation according to an embodiment of this application.

It should be noted that, referring to FIG. 18, the circuit for performing a matrix multiplication operation may further include a first memory 1704, and the first memory is configured to store the matrix A1, the matrix B2, and the index matrix. In this case, the obtaining circuit 1701 may read the matrix A1, the matrix B2, and the index matrix from the first memory 1704. Alternatively, the obtaining circuit 1701 may first obtain the matrix A1 and the matrix B1, and then generate the matrix B2 and the index matrix based on the matrix B1.

(2) The data selection circuit 1702 generates n matrices A2 based on the index matrix and the matrix A1.

(3) The computing unit array 1703 generates a matrix C based on the n matrices A2 and the matrix B2.

Figure 19:
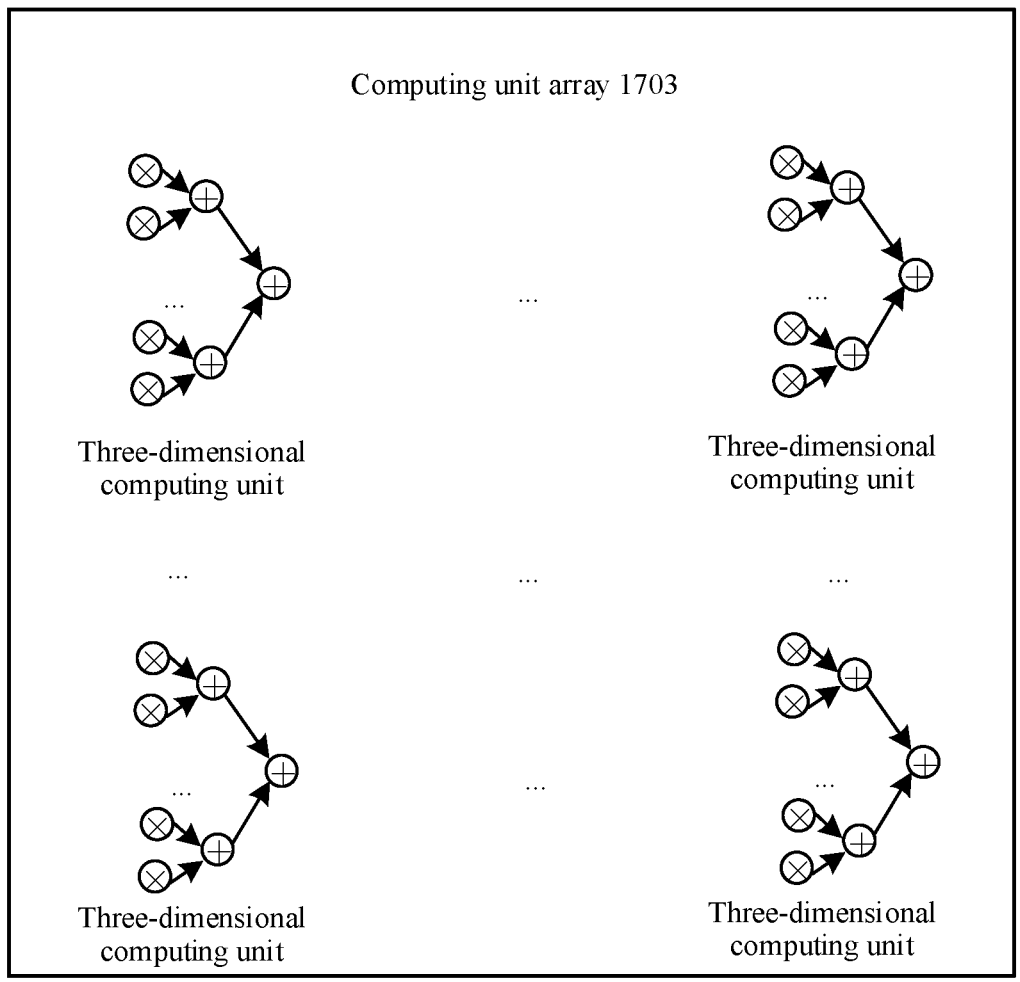
FIG. 19 is a schematic structural diagram of a computing unit array according to an embodiment of this application.

It should be noted that, as shown in FIG. 19, the computing unit array 1703 includes a plurality of three-dimensional computing units, the plurality of three-dimensional computing units may be distributed in m rows and n columns, and each three-dimensional computing unit includes a plurality of multiplication units and addition units. For example, the three-dimensional computing unit may be a multiply and accumulate (mac) unit. One three-dimensional computing unit may be configured to compute a product of one row of one matrix A2 and one column of the matrix B2. One column of three-dimensional computing units (m three-dimensional computing units) may be configured to compute a product of one matrix A2 and one column of the matrix B2. In other words, one column of three-dimensional computing units may compute elements in one column of the matrix C. Therefore, n columns of three-dimensional computing units may compute elements in n columns of the matrix C. In this way, the matrix C may be obtained.

In addition, after obtaining the matrix C, the computing unit array 1703 may further store the matrix C into a register group. The register group may be included in the first memory 1704, or may be included in another memory. This is not limited in this embodiment of this application.

A process in which the circuit for performing a matrix multiplication operation implements the method for performing a matrix multiplication operation provided in the embodiment in FIG. 10 may include the following operations (4) to (6):

(4) The obtaining circuit 1701 obtains a matrix B1, a matrix A2, and an index matrix.

It should be noted that, referring to FIG. 18, the circuit for performing a matrix multiplication operation may further include a first memory 1704, and the first memory is configured to store the matrix B1, the matrix A2, and the index matrix. In this case, the obtaining circuit 1701 may read the matrix B1, the matrix A2, and the index matrix from the first memory 1704. Alternatively, the obtaining circuit 1701 may first obtain the matrix A1 and the matrix B1, and then generate the matrix A2 and the index matrix based on the matrix A1.

(5) The data selection circuit 1702 generates m matrices B2 based on the index matrix and the matrix B1.

(6) The computing unit array 1703 generates a matrix C based on the matrix A2 and the m matrices B2.

It should be noted that, as shown in FIG. 19, the computing unit array 1703 includes a plurality of three-dimensional computing units, the plurality of three-dimensional computing units may be distributed in m rows and n columns, and each three-dimensional computing unit includes a plurality of multiplication units and addition units. For example, the three-dimensional computing unit may be a mac unit. One three-dimensional computing unit may be configured to compute a product of one row of the matrix A2 and one column of one matrix B2. One row of three-dimensional computing units (n three-dimensional computing units) may be configured to compute a product of one row of the matrix A2 and one matrix B2. In other words, one row of three-dimensional computing units may compute elements in one row of the matrix C. Therefore, m rows of three-dimensional computing units may compute elements in m rows of the matrix C. In this way, the matrix C may be obtained.

In addition, after obtaining the matrix C, the computing unit array 1703 may further store the matrix C into a register group. The register group may be included in the first memory 1704, or may be included in another memory. This is not limited in this embodiment of this application.

Next, a SOC provided in the embodiments of this application is described.

The SOC provided in the embodiments of this application may include the circuit for performing a matrix multiplication operation in the foregoing embodiment, and may further include another component.

Figure 20:
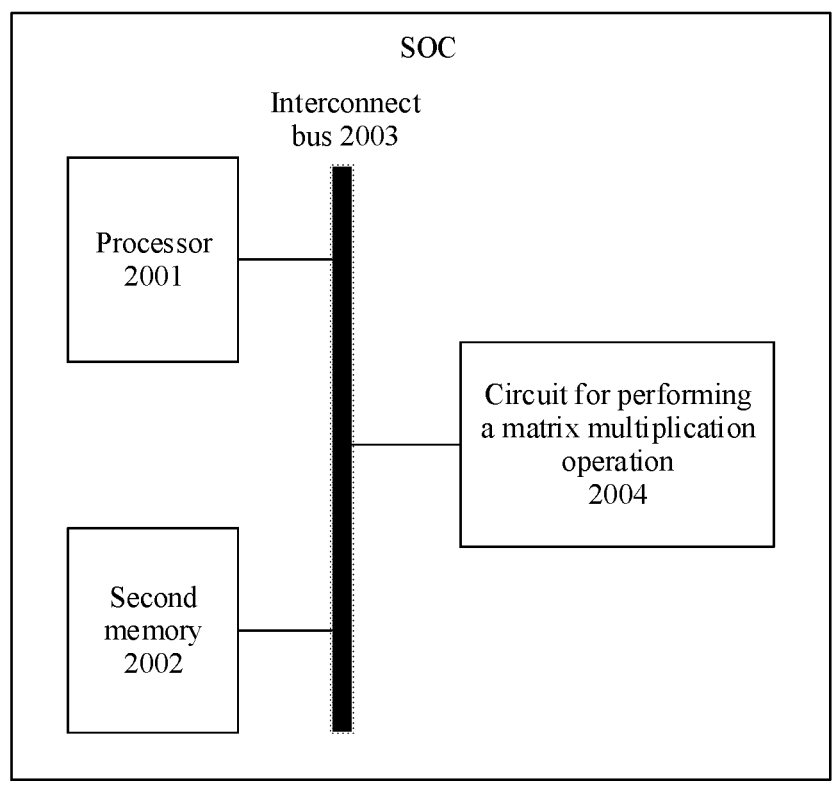
FIG. 20 is a schematic structural diagram of a SOC according to an embodiment of this application.

For example, FIG. 20 is a schematic structural diagram of a SOC according to an embodiment of this application. Referring to FIG. 20, the SOC includes: a processor 2001 (which, in some applications, is also referred to as a processor core or a CPU, for example, a processor core based on an ARM architecture), a second memory 2002, an interconnect bus 2003, and a circuit 2004 for performing a matrix multiplication operation. The circuit 2004 for performing a matrix multiplication operation may be the circuit for performing a matrix multiplication operation in the foregoing embodiment. The processor 2001 is configured to control the circuit 2004 for performing a matrix multiplication operation, for example, send required data, or receive an operation result of the circuit 2004 for performing a matrix multiplication operation.

It should be noted that, data stored in the second memory 2002 is the same as data stored in the first memory 1704. To be specific, the second memory is configured to store a matrix A1, a matrix B2, and an index matrix, or configured to store a matrix B1, a matrix A2, and an index matrix. The first memory 1704 may be a RAM or the like. The second memory 2002 may be a double data rate (DDR) synchronous dynamic random access memory or the like.

In an embodiment, when the SOC is to perform a matrix multiplication operation, the processor 2001 controls, by using the interconnect bus 2003, the circuit 2004 for performing a matrix multiplication operation to be started.

In an embodiment, the circuit 2004 for performing a matrix multiplication operation directly performs the matrix multiplication operation based on the data stored in the second memory 2002. In an embodiment, after the circuit 2004 for performing a matrix multiplication operation is started, the obtaining circuit 1701 in the circuit for performing a matrix multiplication operation reads data (reads the matrix A1, the matrix B2, and the index matrix, or reads the matrix B1, the matrix A2, and the index matrix) from the second memory 2002 by using the interconnect bus 2003. Then, the data selection circuit 1702 and the computing unit array 1703 in the circuit 2004 for performing a matrix multiplication operation complete the matrix multiplication operation based on the data read by the obtaining circuit 1701 from the second memory 2002, and return an operation result to the second memory 2002.

In another embodiment, the circuit 2004 for performing a matrix multiplication operation directly performs the matrix multiplication operation based on the data stored in the first memory 1704. In an embodiment, before the first memory 1704 stores the matrix A1, the matrix B2, and the index matrix, or stores the matrix B1, the matrix A2, and the index matrix, after started, the circuit 2004 for performing a matrix multiplication operation reads data (reads the matrix A1, the matrix B2, and the index matrix, or reads the matrix B1, the matrix A2, and the index matrix) from the second memory 2002 by using the interconnect bus 2003, and then stores the data read from the second memory 2002 into the first memory 1704. Then, the obtaining circuit 1701 in the circuit 2004 for performing a matrix multiplication operation reads data (reads the matrix A1, the matrix B2, and the index matrix, or reads the matrix B1, the matrix A2, and the index matrix) from the first memory 1704. Then, the data selection circuit 1702 and the computing unit array 1703 in the circuit 2004 for performing a matrix multiplication operation complete the matrix multiplication operation based on the data read by the obtaining circuit 1701 from the first memory 1704, and return an operation result to the first memory 1704 and/or the second memory 2002.

All or some of the foregoing embodiments may be implemented in software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method for performing a matrix multiplication operation, comprising:
   obtaining, by an obtaining circuit of a multiplication circuit, a matrix B1, a matrix A2, and an index matrix, wherein the index matrix comprises indices, in a matrix A1, of elements in the matrix A2, the matrix B1 includes k rows and n columns, the matrix A2 includes m rows and t columns, the index matrix includes m rows and t columns, the matrix A1 includes m rows and k columns, wherein k, n, m, and t are all positive integers, and t is less than or equal to k;
   generating, by a data selection circuit of the multiplication circuit, m matrices B2 based on the index matrix and the matrix B1, wherein each of the m matrices B2 includes t rows and n columns, and each row of each matrix B2 is indicated in the matrix B1 by a corresponding element in the index matrix; and
   generating, by a computing unit array of the multiplication circuit, a matrix C based on the matrix A2 and the m matrices B2, wherein the matrix C is a product of the matrix A1 and the matrix B1, the matrix C includes m rows and n columns, and each row of the matrix C is a product of a corresponding row of the matrix A2 and a corresponding matrix B2.

2. The method according to claim 1, wherein the obtaining the matrix A2 comprises:
   generating the matrix A2 based on the matrix A1, wherein the m rows of the matrix A2 are in a one-to-one correspondence with the m rows of the matrix A1 in sequence, and elements in each row of the matrix A2 comprise all non-zero elements in groups that are sequentially arranged in a corresponding row of the matrix A1 and whose quantity is a preset value.

3. The method according to claim 2, wherein for any non-zero element in the matrix A2, a column index of the non-zero element in the matrix A1 is a column number of a column to which the non-zero element belongs in the matrix A1.

4. The method according to claim 1, wherein the matrix A1 is obtained through training by using a neural network.

5. The method according to claim 1, wherein the obtaining the index matrix comprises:
   generating the index matrix based on the matrix A1, wherein the m rows of the index matrix are in a one-to-one correspondence with the m rows of the matrix A2 in sequence, and elements in each row of the index matrix are column indexes, in the matrix A1, of all elements that are sequentially arranged in a corresponding row of the matrix A2.

6. The method according to claim 1, wherein the matrix A2 comprises all non-zero elements in the matrix A1, and the index matrix comprises indexes, in the matrix A1, of all non-zero elements in the matrix A1.

7. The method according to claim 1, wherein the matrix A1 satisfies a conditional sparsity.

8. The method according to claim 7, wherein elements in each of the m rows of the matrix A1 are grouped into at least one group, a quantity of elements in each group is the same, and a quantity of non-zero elements in each group is the same.

9. The method according to claim 8, wherein the quantity of elements in each group is 4 and the quantity of non-zero elements in each group is 2.

10. A circuit for performing a matrix multiplication operation, comprising:
    an obtaining circuit configured to obtain a matrix B1, a matrix A2, and an index matrix, wherein the index matrix comprises indices, in a matrix A1, of elements in the matrix A2, the matrix B1 includes k rows and n columns, the matrix A2 includes m rows and t columns, the index matrix includes m rows and t columns, the matrix A1 includes m rows and k columns, k, n, m, and t are all positive integers, and t is less than or equal to k;
    a data selection circuit configured to generate m matrices B2 based on the index matrix and the matrix B1, wherein each of the m matrices B2 includes t rows and n columns, the m matrices B2 are in a one-to-one correspondence with the m rows of the index matrix in sequence, t rows of each matrix B2 are in a one-to-one correspondence with t elements in a corresponding row of the index matrix in sequence, and each row of each matrix B2 is a row indicated in the matrix B1 by a corresponding element in the index matrix; and
    a computing unit array configured to generate a matrix C based on the matrix A2 and the m matrices B2, wherein the matrix C is a product of the matrix A1 and the matrix B1, the matrix C includes m rows and n columns, the m rows of the matrix C are in a one-to-one correspondence with the m rows of the matrix A2 in sequence, the m rows of the matrix C are in a one-toone correspondence with the m matrices B2 in sequence, and each row of the matrix C is a product of a corresponding row of the matrix A2 and a corresponding matrix B2.

11. The circuit according to claim 10, wherein when being configured to obtain the matrix A2, the obtaining circuit is configured to:
generate the matrix A2 based on the matrix A1, wherein them rows of the matrix A2 are in a one-to-one correspondence with the m rows of the matrix A1 in sequence, and elements in each row of the matrix A2 comprise all non-zero elements in groups that are sequentially arranged in a corresponding row of the matrix A1 and whose quantity is a preset value.

12. The circuit according to claim 11, wherein for any non-zero element in the matrix A2, a column index of the non-zero element in the matrix A1 is a column number of a column to which the non-zero element belongs in the matrix A1.

13. The circuit according to claim 10, wherein the matrix A1 is obtained through training by using a neural network.

14. The circuit according to claim 10, wherein the circuit further comprises a first memory configured to store the matrix B1, the matrix A2, and the index matrix;
wherein the obtaining circuit is configured to read the matrix B1, the matrix A2, and the index matrix from the first memory.

15. The circuit according to claim 10, wherein when being configured to obtain the index matrix, the obtaining circuit is configured to:
generating the index matrix based on the matrix A1, wherein the m rows of the index matrix are in a one-to-one correspondence with the m rows of the matrix A2 in sequence, and elements in each row of the index matrix are column indexes, in the matrix A1, of all elements that are sequentially arranged in a corresponding row of the matrix A2.

16. The circuit according to claim 10, wherein the matrix A2 comprises all non-zero elements in the matrix A1, and the index matrix comprises indexes, in the matrix A1, of all non-zero elements in the matrix A1.

17. The circuit according to claim 10, wherein the matrix A1 satisfies a conditional sparsity.

18. The circuit according to claim 17, wherein elements in each of them rows of the matrix A1 are grouped into at least one group, a quantity of elements in each group is the same, and a quantity of non-zero elements in each group is the same.

19. The circuit according to claim 18, wherein the quantity of elements in each group is 4 and the quantity of non-zero elements in each group is 2.

20. A system on chip (SOC), comprising:
a circuit; and
a processing core configured to control the circuit to perform a matrix multiplication operation, wherein the circuit comprises:
an obtaining circuit configured to obtain a matrix B1, a matrix A2, and an index matrix, wherein the index matrix comprises indices, in a matrix A1, of elements in the matrix A2, the matrix B1 includes k rows and n columns, the matrix A2 includes m rows and t columns, the index matrix includes m rows and t columns, the matrix A1 includes m rows and k columns, k, n, m, and t are all positive integers, and t is less than or equal to k;
a data selection circuit configured to generate m matrices B2 based on the index matrix and the matrix B1, wherein each of the m matrices B2 includes t rows and n columns, the m matrices B2 are in a one-to-one correspondence with the m rows of the index matrix in sequence, t rows of each matrix B2 are in a one-to-one correspondence with t elements in a corresponding row of the index matrix in sequence, and each row of each matrix B2 is a row indicated in the matrix B1 by a corresponding element in the index matrix; and
a computing unit array configured to generate a matrix C based on the matrix A2 and the m matrices B2, wherein the matrix C is a product of the matrix A1 and the matrix B1, the matrix C includes m rows and n columns, the m rows of the matrix C are in a one-to-one correspondence with the m rows of the matrix A2 in sequence, the m rows of the matrix C are in a one-to-one correspondence with the m matrices B2 in sequence, and each row of the matrix C is a product of a corresponding row of the matrix A2 and a corresponding matrix B2.

* * * * *

UNITED STATES PATENT AND TRADEMARK OFFICE
CERTIFICATE OF CORRECTION

PATENT NO. : 11,263,292 B2
APPLICATION NO. : 17/324533
DATED : March 1, 2022
INVENTOR(S) : He et al.

It is certified that error appears in the above-identified patent and that said Letters Patent is hereby corrected as shown below:

In the Claims

In Claim 11, Column 25, Line 9, delete "them rows of the matrix" and insert --the m rows of the matrix--.

In Claim 18, Column 25, Line 45, delete "each of them rows of the matrix" and insert --each of the m rows of the matrix--.

Signed and Sealed this
Fourteenth Day of June, 2022

Katherine Kelly Vidal
*Director of the United States Patent and Trademark Office*